United States Patent
Soto et al.

(10) Patent No.: US 10,749,610 B2
(45) Date of Patent: Aug. 18, 2020

(54) SYSTEM AND METHOD FOR A SUBSCRIBER-POWERED NETWORK ELEMENT

(71) Applicants: Alexander Soto, San Diego, CA (US); Walter Soto, San Clemente, CA (US)

(72) Inventors: Alexander Soto, San Diego, CA (US); Walter Soto, San Clemente, CA (US)

(*) Notice: Subject to any disclaimer, the term of this patent is extended or adjusted under 35 U.S.C. 154(b) by 0 days.

(21) Appl. No.: 16/691,531

(22) Filed: Nov. 21, 2019

(65) Prior Publication Data
US 2020/0119816 A1    Apr. 16, 2020

Related U.S. Application Data

(60) Division of application No. 15/497,180, filed on Apr. 25, 2017, now Pat. No. 10,498,463, which is a continuation of application No. 15/338,379, filed on Oct. 29, 2016, now Pat. No. 9,647,773, which is a continuation of application No. 14/373,421, filed as application No. PCT/US2011/026417 on Feb. 28, 2011, now Pat. No. 9,515,747, which is a continuation-in-part of application No. 12/714,543, filed on Feb. 28, 2010, now Pat. No. 8,543,008, which is a continuation-in-part of application No. 11/764,228, filed on Jul. 17, 2007, now Pat. No. 7,672,591, which is a continuation-in-part of application No. 11/365,912, filed on Mar. 1, 2006, now abandoned.

(60) Provisional application No. 60/657,511, filed on Mar. 1, 2005.

(51) Int. Cl.
| H04J 14/00 | (2006.01) |
|---|---|
| H04B 10/80 | (2013.01) |
| H04B 10/00 | (2013.01) |
| H04B 10/27 | (2013.01) |

(52) U.S. Cl.
CPC .......... *H04B 10/808* (2013.01); *H04B 10/00* (2013.01); *H04B 10/27* (2013.01)

(58) Field of Classification Search
CPC ....... H04B 10/808; H04B 10/00; H04B 10/27
USPC .......................................................... 398/71
See application file for complete search history.

(56) References Cited

U.S. PATENT DOCUMENTS

| 7,652,390 B2 * | 1/2010 | Vrla | H04B 3/542 |
|---|---|---|---|
| | | | 307/1 |
| 10,171,180 B2 * | 1/2019 | Sipes, Jr. | H04B 10/808 |
| 2008/0025725 A1 * | 1/2008 | Jette | H04J 14/02 |
| | | | 398/71 |

(Continued)

*Primary Examiner* — Mohammad R Sedighian

(57) ABSTRACT

A system for powering a network element of a fiber optic wide area network is disclosed. When communication data is transferred between a central office (CO) and a subscriber terminal using a network element to convert optical to electrical (O-E) and electrical to optical (E-O) signals between a fiber from the central office and twisted wire pair, coaxial cable or Ethernet cable transmission lines from the subscriber terminal, techniques related to local powering of a network element or drop site by the subscriber terminal or subscriber premise remote powering device are provided. Certain advantages and/or benefits are achieved using the present invention, such as freedom from any requirement for additional meter installations or meter connection charges and does not require a separate power network.

23 Claims, 26 Drawing Sheets

(56) References Cited

U.S. PATENT DOCUMENTS

2010/0046940 A1* 2/2010 Cotton ................. H04B 10/808
398/17
2014/0369687 A1* 12/2014 Jain ........................ H04L 12/10
398/66

* cited by examiner

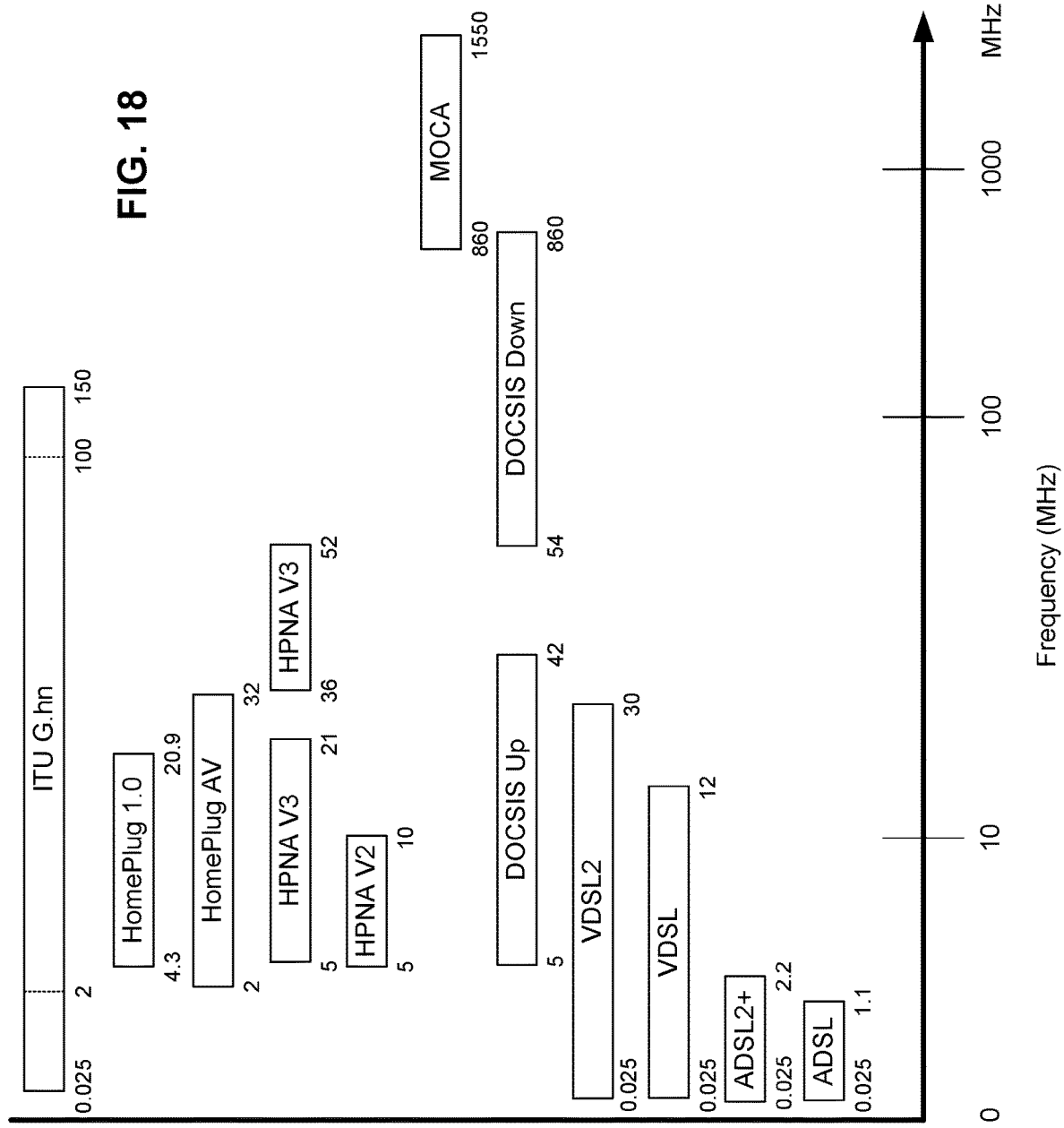

SYSTEM AND METHOD FOR A SUBSCRIBER-POWERED NETWORK ELEMENT

CROSS-REFERENCES TO RELATED APPLICATIONS

This application is filed under 37 C.F.R. § 1.53(b) as a divisional claiming the benefit under 35 U.S.C § 121 of the pending U.S. patent application Ser. No. 15/497,180, "System and Method For A Subscriber-Powered Network Element", which was filed by the same inventors on Apr. 25, 2017, claiming the benefit under 35 U.S.C § 120 of U.S. patent application Ser. No. 15,338,379, "System and Method For A Subscriber-Powered Network Element", which was filed by the same inventors on Oct. 29, 2016 claiming the benefit under 35 U.S.C § 120 of U.S. patent application Ser. No. 14/373,421, "System and Method For A Subscriber-Powered Network Element", which was filed by the same inventors on Jul. 21, 2014 claiming the benefit of 371 international application PCT/US11/26417 filed on Feb. 22, 2011 claiming the benefit under 37 C.F.R. § 1.53(b) of U.S. patent application Ser. No. 12/714,543, "System and Method For A Subscriber-Powered Network Element", which was filed by the same inventors on Feb. 28, 2010 claiming the benefit under 37 C.F.R. § 1.53(b)(2) of the patent application Ser. No. 11/764,228, "System and Method For A Subscriber-Powered Network Element", which was filed by the same inventors on Jul. 17, 2007 claiming the benefit under 37 C.F.R. § 1.53(b)(2) of patent application Ser. No. 11/369,512 which was filed by the same inventors on Mar. 1, 2006, now abandoned, claiming the benefit under 35 U.S.C. 119(e) of U.S. Provisional Patent Application No. 60/657,511 filed on Mar. 1, 2005, and entirely incorporated herein by reference.

FIELD OF THE INVENTION

The invention relates generally to fiber optic communication networks, more specifically to the electrical powering architecture of optical access networks, wide area networks, broadband communications or telecommunication systems.

BACKGROUND OF THE INVENTION

With increasing customer or subscriber demand for transmitting and receiving increasingly greater amounts of information, telecommunication and broadband cable communication companies are being pushed to upgrade their wide area network (WAN) or broadband access communication network infrastructures. In order to supply more information in the form of video, audio and telephony at higher rates, higher bandwidth communication network upgrades or new deployments are required. Twisted wire pair cable, such as used in plain old telephone services, do not support high bandwidths over a great distance; and while coaxial cables, such as used in cable television services, do a better job, it too has reach and bandwidth limitations. Optical fiber can provide virtually unlimited bandwidth thus enabling broadband and multimedia services.

Modern telephone wide area network access infrastructures, such as fiber in the loop networks (FITL), utilize a combination of fiber optics and twisted wire pair to send and receive data communications to and from a subscriber. While modern cable wide area network access infrastructures, such as Hybrid Fiber Coaxial networks (HFC), utilize a combination of fiber optic and coaxial cable to send and receive data communications to and from a subscriber. Generally, subscribers are served by twisted wire pair in the last mile or so of the telecommunication networks or by coaxial cable within the last two to three miles or so of cable networks. In order to achieve greater bandwidth rates at a subscriber location, the fiber optic network must be brought closer to the subscriber so that the copper drop (e.g., twisted wire pair or coaxial cable) is of a sufficiently short distance and will be capable of supporting increased data transfer rates.

One major problem with bringing fiber cable within a short distance of a subscriber location is the added burden of maintaining the multitude of optical to copper drop sites. These drop sites are network elements that are called optical network units (ONUs) or optical network terminals (ONTs) in telecommunication networks and optical node (or simply a node) in hybrid fiber cable networks and generally serve to convert information between the optical domain of a fiber and electrical domain of a twisted pair or coaxial cable.

A significant part of the provisioning and maintenance of these drop sites by Service Providers or their affiliates (e.g., broadband access service provider, application service providers, internet service providers, managed service providers, master managed service providers, managed internet service providers, telecommunication service providers, campus service providers, cable service providers) is supplying the electrical power required. Optical fiber itself is not capable of carrying the electricity to power these drop sites. This creates a challenge in planning, distributing and deployment of electricity to power the drop site energy needs. Furthermore, reserve power must also be provided if the main power supply to the drop site fails and with enough reserve powering capacity capable of meeting performance and reliability requirements of the network for several hours or even days. This is often the case with Lifeline telephony service, which is required in plain old telephone service networks. Lifeline telephone means that the subscriber telephones must remain energized and operational during an AC supply power interruption or outage at the subscriber premise.

The drop sites are typically centrally powered from a Service Provider or affiliates' distributed copper facility or a power node located near a cluster of drop sites, or locally powered from a nearby commercial or utility electrical power source, or with solar photovoltaic energy.

In the case of centralized power, power is typically provided over new or existing copper facilities from a central office (CO). Power can also be provided on separate twisted wire pair or coaxial cable that are bonded to the outside of a fiber cable bundle, woven within a fiber optical cable bundle or deployed separately with the fiber during installation of the fiber from the central office. However, centralized power is a strategy that requires a separate power network to be deployed that is separate from the information network. With increasing distances between a central office or head end to the remote drop sites increased voltages are required on the power network to feed the drop site energy needs. Increased voltages raise craft safety issues. Alternatively, the power network may be augmented with power nodes located near a cluster of drop sites, however additional metallic enclosures increase susceptibility to electrical surges caused by lightning and power-line induction. Furthermore, there is the 24-hour a day cost of supplying electricity to the power network, as well as regular maintenance and support of the power network itself including regular replacement of batteries for Lifeline services, which are generally located at the CO or head end.

In the case of locally powered drop sites, power is derived near a drop site and reserve power is provided with batteries at the drop site. The primary energy source for this architecture is commercial AC power tapped directly from a power utility's facility. The power supply is placed in a small environmentally hardened enclosure that could be co-located with a drop site; however, the batteries are generally in the same enclosure as the drop site. This results in a large number of battery sites and power access points. Generally the cost of this type of system is high primarily due to the cost of connecting drop sites to a commercial power source. Regional power utility companies may insist on metered connections to their power grid, incurring a one-time ac meter installation and connection charge to be levied. Additionally a minimum monthly meter charge may be levied regardless of usage. This poses a major problem when the monthly energy consumption of a drop site is significantly lower than the minimum charge.

In the case of electrically powering the communication network infrastructure locally with solar power, this strategy minimizes some of the disadvantages of centralized and locally powering such as vulnerability to lightning and limited battery reserve, allowing fiber to be the sole distribution facility. Solar panels and large batteries are co-located at drop sites, which power the drop sites continuously without any connection to any power grid. However, its use is limited to areas with direct access to sunlight as the output of solar panels decreases with a reduction in incident solar energy. Therefore, this strategy cannot be used everywhere. In addition, solar power requires batteries of large capacity (Wh) to be installed.

As such, a need exists for powering a fiber optic communication network element that brings optical access fiber within a short distance of a subscriber premise or customer location. The electrical powering strategy or architecture of the fiber optic wide area network must be capable of supporting and operating the multitude of drop sites or network elements in a cost effective and maintainable manner.

BRIEF SUMMARY OF THE INVENTION

According to the present invention, techniques related to local powering of a network element or drop site of a wide area access network by a subscriber terminal, adaptor, router, server, gateway, or customer premise equipment (CPE) which combines an electrical power signal or electricity, which may be derived from subscriber mains power (e.g., AC power), with the electrical data communications as a combined electrical WAN signal over the same communication medium connecting the network element or drop site and the subscriber terminal, adaptor, router, server, gateway or CPE are provided. Certain advantages and/or benefits may be achieved using embodiments of the present invention. For example, the embodiments of the present invention have the advantage of being free of any requirement for additional meter installations or meter connection charges. Additionally, embodiments of the present invention have the advantage of reducing labor installation time and costs and enabling subscriber self installation. Furthermore, embodiments of the present invention do not create a separate power network. The information network and the power network are the same network in that they share the same transmission line (e.g., twisted copper wire pair or twisted wire pair, coaxial cable or Ethernet cable), thus the communication network can be powered in a cost effective and maintainable manner.

In general, in one aspect, an embodiment of the invention includes a system for powering a network element of a fiber optic wide area network, such as a fiber in the loop network, which transmits communication data between a central office (CO) and subscriber terminal or customer premise equipment. The network element, such as a drop site, having an at least one optical port and at least one electrical port, serves, among other functions, to convert optical-to-electrical (O-E) and electrical-to-optical (E-O) signals carrying information between a fiber from the central office and twisted wire pair to the subscriber terminal. The subscriber terminal or a remote user device further includes a DC power source, a communication device such as a high-speed client modem, and an electrical coupling device such as a Subscriber Line Interface Circuit (SLIC) device that includes means for coupling the communications of the client modem and the DC power output of the DC power source on to the same physical communication medium. The network element further includes a communication device such as a high-speed CO modem, a DC-to-DC power converter, and an electrical coupling device such as a Data Access Arrangement (DAA) device that includes means for coupling the electrical communications of the CO modem and deliver DC power from the subscriber terminal to the network element's DC-to-DC power supply converter. A pair of twisted wires that is in electrical communication between the subscriber terminal and the network element serves as a medium for DC power transfer to the network element and for modem communications. In this way, the network element is powered by the subscriber premise over the twisted wire pair cable and the modems are in communication over the same twisted wire pair cable.

Aspects of an embodiment of the invention may include one or more of the following features. The fiber optic wide area network is a fiber in the loop network such as a Fiber to the Curb (FTTC) network, a Fiber to the Premise (FTTP) network, a Fiber to the Node (FTTN) network, a Fiber to the Basement (FTTB) network, a Fiber to the Cell Tower network or some combination thereof. Furthermore, the Fiber in the loop network may be a point-to-point network or a point-to-multipoint network, such as a Passive Optical Network (PON). For example, the Fiber in the loop network may be a point-to-point Fiber to the Curb network (FTTC-P2P) or a passive optical Fiber to the Curb network (FTTC-PON) implementation. The communication devices or modems, according to an embodiment of the invention, may be Digital Subscriber Line (xDSL) type of modems such as Asymmetric Digital Subscriber Line (ADSL) modems, Very-high-bit-rate Digital Subscriber line (VDSL) modems, or Very-high-bit-rate Digital Subscriber Line 2 (VDSL2) modems. The communication devices or modems may also be Power Line, also called Power Line Communication or Power Line Carrier (PLC), modems. Additionally the communication devices or modems may be ITU-T G.hn modems. The electrical coupling devices such as the SLIC and DAA devices may comprise coupling capacitors, coupling transformers, blocking inductors, or perform inductive coupling. Furthermore, the SLIC and DAA devices may include elements for low pass filtering, bandpass filtering, and/or high pass filtering. The SLIC device will limit the current of the transmitted DC power to non-hazardous levels for the potential of unprotected human contact. The pair of twisted wires is a twisted wire pair wire such as 22, 24 or 26 gauge twisted wire pair, but may also be a single pair from a category 3 cable, or a single pair from a category 5 cable. The network element that is powered by the subscriber maybe an optical network unit (ONU) or an optical network terminal (ONT). The subscriber terminal, customer premise equipment or remote user device may further include one or more of the following features for remote user use: an Ethernet local area network (LAN), a WiFi network, a Voice over IP (VoIP) service, an IPTV service, interactive broadband communications services or combination thereof. The subscriber terminal, customer premise equipment or remote user device my also provide Plain Old Telephone Service (POTS) or Analog Telephone Adaptor (ATA) functions and include a battery backup in case of subscriber mains power loss to provide lifeline support. The battery may be user, customer or subscriber replaceable. The battery may also be located at the network element. The DC power supply at the subscriber or customer premise may be a DC-to-DC power supply or an AC-to-DC power supply and the electrical power may be derived from the subscriber mains power by the DC-to-DC or AC-to-DC power supply.

In general, in another aspect, an embodiment of the invention includes a system for powering a network element of a fiber optic wide area network, such as a fiber to the premise (FTTP) network, which enables broadband communications between a CO and a subscriber or customer. The network element, such as an ONU or ONT, generally, at a high level description, serves to convert information from the optical domain of optical fiber coming to the network element from a CO to electrical signals on twisted wire pairs or that run between the network element and a subscriber terminal or customer premise equipment. The ONU or ONT is located at the subscriber or customer premise, specifically at the point of demarcation or network interface device (NID). Alternatively, the ONT can be located within the subscriber or customer premise (i.e. on the subscriber's side of the NID) when allowed by local regulation. While not shown in the following embodiments of the present invention, alternative embodiments with the ONT inside the subscriber's premise are possible and implied. The subscriber terminal or a remote user device further includes an electrical coupling device such as a Power over Ethernet (PoE) Power Sourcing Equipment (PSE) and a communication device such as an Ethernet PHY device. The PSE is coupled to two or four pairs of wires, such as in a category 5 cable, to the ONU or ONT at the NID. The ONU or ONT further includes an electrical coupling device such as a PoE Powered Device (PD) that accepts power from the PSE and powers the ONU or ONT. Additionally the ONU or ONT includes a second communication device such as an Ethernet PHY device enabling Ethernet communication between the subscriber terminal or remote user device and the ONU or ONT at the NID. In this way, the network element is powered by Power over Ethernet from a subscriber or customer premise and capable of communications with the subscriber terminal over the same pairs of wires. The subscriber terminal, customer premise equipment or remote user device may further include one or more of the following features for remote user use: an Ethernet local area network (LAN), a WiFi network, a Voice over IP (VoIP) service, an IPTV service or interactive broadband communications services or combination thereof.

In general, in one aspect, an embodiment of the invention includes a system for powering a first network element of a fiber optic wide area network, such as a hybrid fiber coaxial network, which transmits communication data between a head-end and a subscriber terminal or customer premise equipment. The first network element, such as a drop site, serves to convert optical to electrical (O-E) and electrical to optical (E-O) signals between a fiber from the head-end and coaxial cable to the subscriber terminal. The subscriber terminal or a remote user device further includes a DC power source, a communication device such as a high-speed client modem or client network device, and a first electrical coupling device that includes means for coupling the communications of the client modem or client network device to the DC power output of the DC power source. The network element further includes a communication device such as a high-speed head-end modem or access network controller device, a DC-to-DC power converter, and a second electrical coupling device that includes means for coupling communications of the head-end modem or network access controller device and delivers DC power to the DC-to-DC power converter. A coaxial cable that is coupled between the subscriber terminal and the network element serves the medium for DC power transfer to the network element and for network communications. In this way, the first network element is powered by the subscriber terminal over the coaxial cable and the modems or network devices are in communication over the same coaxial cable.

Aspects of an embodiment of the invention may include one or more of the following features. The communication devices or modems, according to an embodiment of the invention, may be Data Over Cable Service Interface Specification (DOCSIS) modems. The communication devices or modems may be Power Line, also called Power Line Communication or Power Line Carrier (PLC), modems. The communication devices or network devices may also be HomePNA, Multimedia over Coax Alliance (MoCA) or ITU-T G.hn capable devices. The first and second electrical coupling devices may comprise coupling capacitors, coupling transformers, isolation transformers, center-tapped transformers, blocking inductors, common mode chokes or perform inductive coupling. Furthermore, the first and second electrical coupling devices may include elements for low pass filtering, bandpass filtering, and/or high pass filtering. The first electrical coupling device will limit the current of the DC power transferred to the network element to non-hazardous levels. The first network element that is powered by the subscriber terminal maybe an optical node, network node or simply node. The subscriber terminal, customer premise equipment or remote user device may further include one or more of the following features for remote user use: an Ethernet local area network (LAN), a WiFi network, a Voice over IP (VoiP) service, or an IPTV service. The subscriber terminal, customer premise equipment or remote user device my also provide Plain Old Telephone Service (POTS) and include a battery backup in case of subscriber main power loss to provide lifeline support. The battery may be user, customer or subscriber replaceable at or near the subscriber terminal or CPE. The battery may also be located at the network element. The DC power supply at the subscriber or customer premise may be a DC-to-DC power supply or an AC-to-DC power supply. A second network element, such as a tap, may further contain a device that combines the power and communication from one or more coaxial cables from other subscribers or customer premises to the first network element or node. The first network element may be capable of being powered from the power received from a single subscriber or customer premise.

BRIEF DESCRIPTION OF THE DRAWINGS

FIG. 15b is an illustration of an exemplary circuit model of an electrical coupling device for combining data communications and DC electrical power in view of FIG. 1a.

FIG. 15c is an illustration of an exemplary circuit model of an electrical coupling device for combining data communications and AC electrical power in view of FIG. 1a.

FIG. 16b is an illustration of an exemplary circuit model of an electrical coupling device for combining Ethernet communications and DC electrical power in view of FIG. 7a.

FIG. 18 is an illustration of a chart depicting the frequency spectrum of various communication protocols.

DETAILED DESCRIPTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Figure 1A:
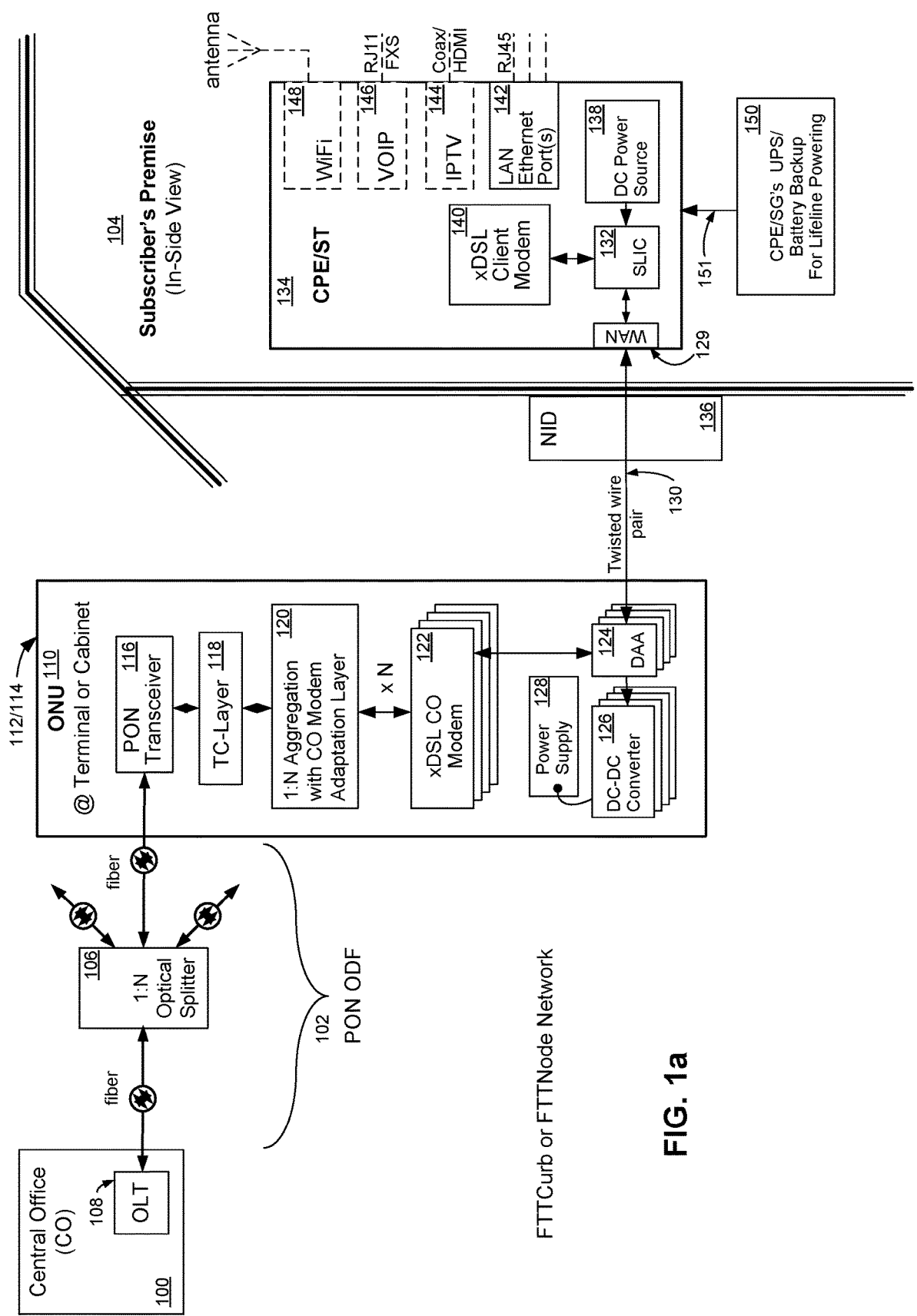
FIG. 1a is a block diagram illustration of a Fiber-to-the-Curb (FTTC) or Fiber-to-the-Node (FTTN) point-to-multipoint passive optical network (PON) with an ONU network element powered by a subscriber's customer premise equipment (CPE) or subscriber terminal (ST) using a single twisted wire pair, in accordance with an embodiment of the present invention.

Referring now to FIG. 1a, wherein like reference numerals designate identical or corresponding parts throughout several views and embodiments, and wherein cascading boxes below a part designates a plurality of such parts, an exemplary embodiment of an electrical power architecture for a fiber optic wide area network is shown incorporating a subscriber-powered network element, according to the present invention. A FTTC or FTTN network using a PON (e.g., B-PON ITU-T G.983, G-PON ITU-T G.984, XG-PON ITU-T G.987, E-PON IEEE 802.3ah, 10G-EPON IEEE 802.3av, WDM-PON, or RFoG SCTE IPS910) connects a central office (CO) 100 at the head end of a passive optical distribution fabric (ODF) 102 to a subscriber premise 104. The subscriber premise 104 may be a residential home, a multi-dwelling unit (MDU), a commercial building, or a cell tower. The passive ODF 102 is comprised of a plurality of passive optical splitters 106 and connectors (not shown). An Optical Line Terminal (OLT) 108, which is generally located at the CO 100 but may be located in a remote or outside plant (OSP) cabinet, acts as a central transmission point and an overall controlling device for the network. The OLT 108 is in communication through the ODF 102 with a plurality of Optical Network Units (ONUs) 110 located in neighborhood terminals (also called pedestals) in FTTC networks 112 or in cabinets in FTTN networks 114.

The OLT 108 transmits and receives data to and from the ONUs 110 in the form of modulated optical light signals of known wavelength through the ODF 102. The transmission mode of the data sent over the ODF 102 may be continuous, burst or both burst and continuous modes. The transmissions may be made in accordance with a time-division multiplexing (TDM) scheme or similar protocol. Frequently bi-directional wavelength-division multiplexing (WDM) is used and although the FTTC/FTTN network illustrated in FIG. 1a includes an OLT 108 in communication with a plurality of ONUs using a plurality of fibers, other implementations of such networks may only use ONTs or some combination of ONUs 110 and ONTs 110. In some implementations, the ONUs and ONTs are generally similar. In other implementations, the ONUs and ONTs may differ in one or more aspects. As previously mentioned, the ONUs and ONTs are drop site network elements that generally, at a high level description, serve to convert information between the optical domain of a fiber and electrical domain of a twisted wire pair wire or possibly coaxial cable.

An ONT is a single integrated electronics unit that terminates the PON and presents native service interfaces to the user or subscriber. An ONU is an electronics unit that terminates the PON and may present one or more converged interfaces, such as xDSL or Ethernet, toward the subscriber. An ONU typically requires a separate subscriber unit to provide native user services such as telephony, Ethernet data, or video. In practice, the difference between an ONT and ONU is frequently ignored, and either term is used generically to refer to both classes of equipment. Although in the hybrid fiber coaxial network case, ONUs/ONTs are called nodes, optical nodes or even taps depending on where the fiber network ends and the coaxial cable network begins.

Referring again to FIG. 1a, an exemplary embodiment of an ONU 110 is comprised of the following functional blocks: a PON transceiver 116, a PON client Transmission Convergence Layer (TC-Layer) unit 118; a CO modem aggregation and adaptation layer unit 120; a plurality of Digital Subscriber Line (xDSL, i.e. ADSL, VDSL, or VDSL2) CO modems 122; a plurality of Digital Access Arrangement (DAA) units 124; a plurality of DC-to-DC power converters 126, and a power supply 128.

The client PON transceiver 116 comprises the necessary components to convert optical-to-electrical (O/E) signal communications from the OLT 108 as well as convert electrical-to-optical (E/O) signal communications and communicate them to the OLT 108. The PON transceiver 116 may be plugged into or comprise an optical port or socket, the optical port serving as a site for coupling to a fiber and for performing the O/E and E/O conversions. Some embodiments of network elements may be made without optical transceivers, however having an optical port for later installation of an optical transceiver. In embodiments of network elements made with an optical transceiver, the optical port and the optical transceiver are essentially the same. Some form factors for PON transceiver 116 include, but not limited to, SFF, SFP, SFP+, and XFP. The PON transceiver 116 communicates electrically with the TC-Layer 118. The TC-Layer 118 comprises the functionality of: bundling and sending data into packets or frames; un-bundling and receiving data into packets or frames; managing the transmission of packets or frames on the network via medium access and bandwidth allocation protocols; providing necessary messaging and end point behavior, and checks, reports and may correct for detectable errors. The TC-Layer 118 communicates with both the PON transceiver 116 and optionally an 1:N aggregation and CO modem adaptation layer 120.

The 1:N aggregation and CO modem adaptation layer 120 has several functions. Modem communications over twisted wire pair transmission lines have lower bandwidth rates than communications over fiber. Thus to efficiently use the higher bandwidth rates of the fiber, the communications from multiple modems may be pooled together. Modem communications from as many as one to some N number, for the purposes of this disclosure, may be aggregated together. In an exemplary embodiment, some 96 modems can be aggregated together. The 1:N aggregation and CO modem adaptation layer 120 communications electrically to an N number of modems. Each modem serving to enable communications to/from a unique subscriber premise 104 over a unique twisted wire pair 130. Additionally, in some embodiments, multiple modem communications may be binded together to/from a unique subscriber premise to achieve data rates beyond the capability of a single modem, these communications may also be aggregated by the 1:N aggregation and CO modem adaption layer 120.

Communication devices such as xDSL capable modems 122 are chosen as the preferred modem types however it is envisioned that many types of modems can be used for communications over twisted wire pair wire or even coaxial cable transmission lines to a subscriber premise 104. The xDSL capable modems of 122 are central office (CO) or head-end type modems. Each modem is in electrical communication with an electrical coupling device such as a DAA 124 and the DAA 124 is coupled to an electrical port or socket (e.g., RJ-11) which is then coupled to twisted wire pair 130.

A DAA 124 is a mandatory interface that protects electronics connected to a telecommunication network from local-loop disturbances and vice versa. A DAA in general can mean many things because a DAA must perform varied and complex functions, including but not limited to line termination, isolation, hybrid functions, caller-ID and ring detection. A DAA must also provide a loop switch so that the DAA looks on- or off-hook to the loop; detect the state of the line and the incoming ringing signal, as well as include support of full-duplex operation. The International Telecommunication Union Telecommunication Standardization Sector (ITU-T) series G specification for transmission systems and media, digital systems and networks contains many documents, recommendations and specifications regarding DAA, as well as subscriber line interface circuits (SLIC) 132, specifically ITU-T G. 100-109 specifications that are hereby included by reference.

For the purpose and needs of an embodiment of the present invention, the electrical coupling device DAA 124 is a device that: meets local regulatory requirements which differ by country or region; provides a measure of protection for both a network element, such as ONU 110, and the local-loop such as twisted wire pair 130 transmission line; passes AC and/or DC based signal information to and from a modem, such as xDSL CO modem 122, as well as decouples or passes DC power (DC current and DC voltage) to a DC-to-DC power converter 126 from a twisted wire pair 130 transmission line. Additionally, the DAA 124 provides isolation protection to the modem from potentially damaging high voltage (e.g., from a lightning strike or malfunctioning equipment) on the twist pair 130. The DAA 124 device may be of a design that is transformer-based, optically-based, capacitively coupled-based, silicon/integrated circuit-based, or some combination thereof which offer virtues in size, cost, and performance.

As previously mentioned or indicated, the ONU 110 can provide broadband services to a plurality of subscriber premises 104 over twisted wire pair transmission lines. Located in each subscriber premise 104 is a customer premise equipment (CPE) or subscriber terminal (ST) device 134 which is connected to the twisted wire pair 130. The twisted wire pair 130 passes through the demarcation point or network interface demarcation (NID) 136 to the CPE or ST 134.

The CPE/ST 134 device and uninterruptable power supply (UPS) 150 is powered by a subscriber's residential or commercial power outlet which are derived from subscriber mains power (not shown). The exemplary CPE/ST 134 is comprised of the functional blocks: a DC power source 138; an xDSL client modem 140; an electrical coupling device such as subscriber line interface circuit (SLIC) 132; one or more Ethernet LAN ports 142 with appropriate media access (MAC) and PHYs for operation with a subscriber's local area network (LAN); optionally one or more Internet Protocol Television (IPTV) codec and driver 144; optionally one or more Voice Over IP (VoIP) codec and driver 146 (including FXS circuitry), and optionally one or more IEEE 802.11x (WiFi) transceiver 148.

The DC Power source 138 may be derived from or be part of a DC-to-DC power supply or an AC-to-DC power supply. The DC Power source 138 provides DC power (DC current and DC voltage), which may be derived from subscriber mains power (e.g., AC power), in one or more power supply rails to the electrical coupling device SLIC 132.

Generally, SLICs provide the necessary signals, timing, and control functions for the plain old telephone system (POTS) line. SLICs and DAAs perform complementary functions with some overlap. The requisite functions of these devices, although similar at first look, differ enough that implementing the technologies requires different techniques. For example, SLICs act as line power drivers as they send ringing signals down the line and supply line power on to the twisted wire pair transmission line, generally from batteries, to the far end of the line. DAAs, on the other hand, act more like receivers and use the supplied line or loop power.

For the purpose and needs of an embodiment of the present invention, the electrical coupling device SLIC 132 is a device that: meets local regulatory requirements which differ by country or region; provides a measure of protection for both a network element, such as ONU 110, and the CPE/ST 104; passes AC and/or DC based information signal to and from a modem, such as xDSL client modem 140; accepts DC power (DC current and DC voltage) from a DC power source, such as 138, and acts as a line power driver driving the accepted DC power and information signal as a combined electrical WAN signal through WAN port 129 and down a twisted wire pair, such as 130. The SLIC 132 device may be of a design that is transformer-based, optically-based, capacitively coupled-based, silicon/integrated circuit-based, or some combination thereof which offer virtues in size, cost, and performance.

The communication device such as xDSL client modem 140 is a complementary modem to the xDSL CO modem 122 and as previously indicated is in electrical signal communication with the SLIC 132. With broadband communications established with the CO 100 and with the optional IPTV 144, VoIP 146, and WiFi 148 components the CPE/ST 134 is enabled to provide broadband internet access services, television subscription or pay-per-view services, VoIP services and wireless LAN services and capabilities.

VoIP service can be used as the primary telephony line service to a subscriber. Primary line means the telephone service will be available all the time, and may even be available during a significant power failure event. In the case where a subscriber suffers a power outage, then the CPE/ST 134 will require a battery or uninterruptible power source 150 to meet lifeline service requirements, according to an embodiment of the invention.

Figure 1B:
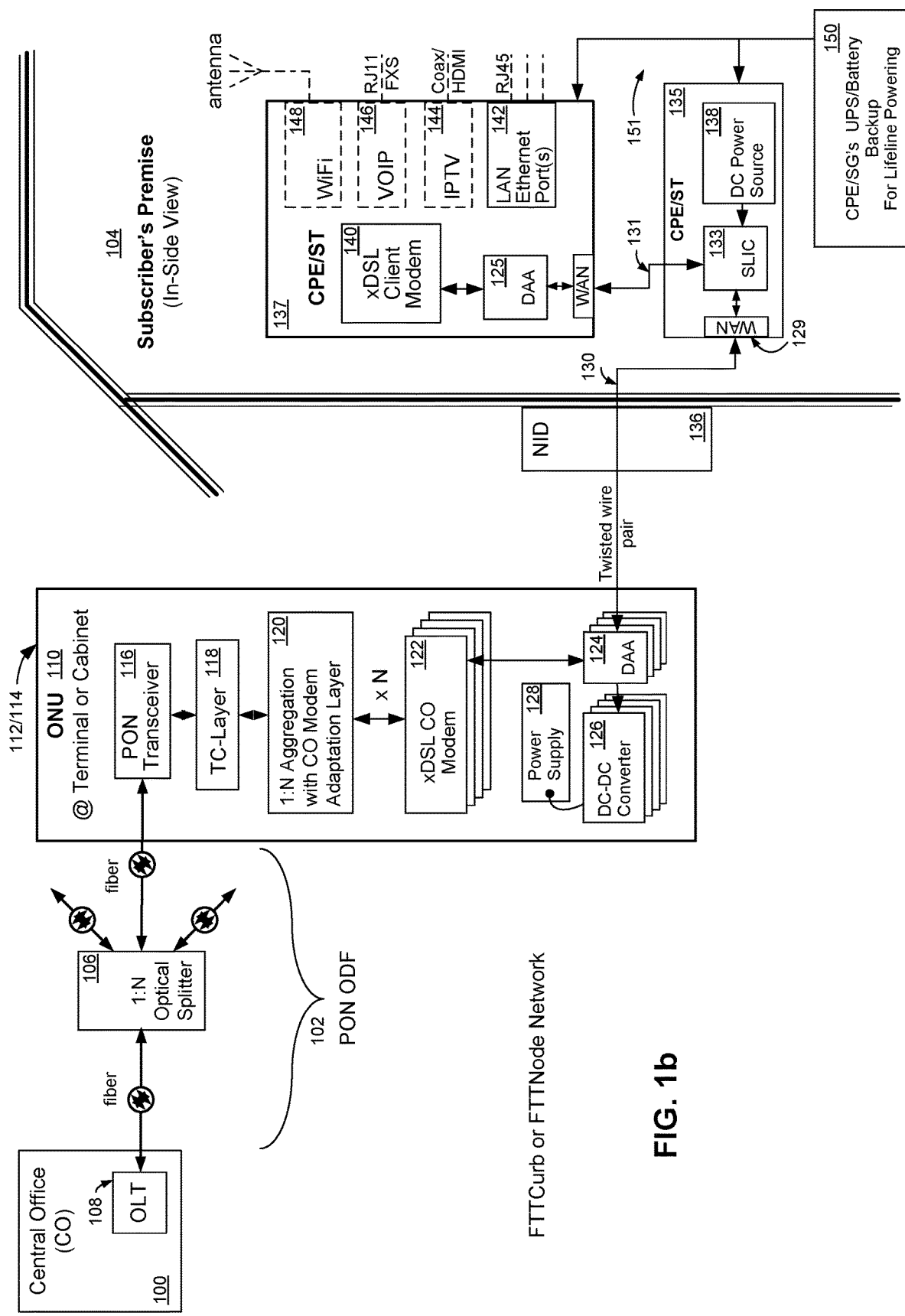
FIG. 1b is a block diagram illustration of a Fiber-to-the-Curb (FTTC) or Fiber-to-the-Node (FTTN) point-to-multipoint passive optical network (PON) with an ONU network element powered by a subscriber terminal or CPE using a single twisted wire pair, in accordance with an embodiment of the present invention.

Referring to FIG. 1*b*, an alternative embodiment of FIG. 1*a* is shown with CPE/ST 135 comprising SLIC 133 and DC Power source 138. SLIC 133 operates similar to SLIC 132, coupling DC power from DC power source 138 onto twisted cooper wire pair 130 with electrical signal communications from xDSL client modem 140 via twisted wire pair 131 onto subscriber-powered twisted wire pair 130. SLIC 133 also decouples electrical signal communications from xDSL CO modem 122 on twisted wire pair 130 onto twisted wire pair 131. CPE/ST 135 allows electrical modem signal communications to be exchanged between network element's CO modem 122 and CPE/ST 137 client modem 140 while coupling electrical power for use by network element ONU 110 on to twisted wire pair 130. In the case where a subscriber suffers a power outage, then the CPE/ST 137 and CPE/ST 135 will require a battery or uninterruptible power source 150 to meet lifeline service requirements, according to an embodiment of the invention.

Figure 2:
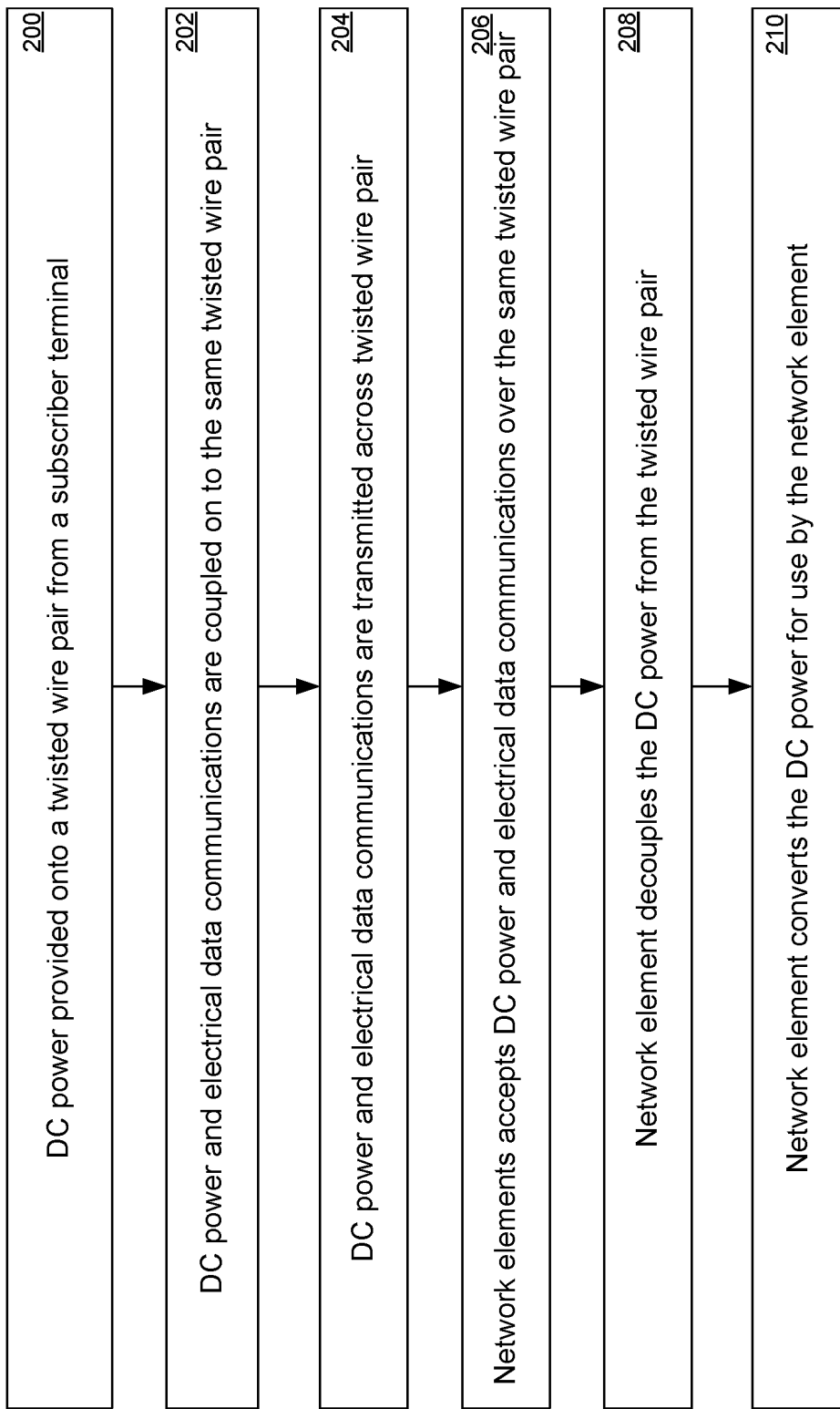
FIG. 2 is a flow chart illustration of a method of an embodiment of the present invention for powering a network element with twisted wire pair cable.

Referring to FIG. 2 in view of FIG. 1*a*, a flow chart of a method of an embodiment of the present invention is illustrated. Powering a network element of a fiber optic wide area network, such as on ONU 110 in FIG. 1*a*, from a subscriber terminal 134 at a subscriber premise 104 entails providing or supplying a DC power (e.g., from DC power source 138) onto a twisted wire pair 130 as described at block 200. At block 202, electrical data communications from a communication device or modem, as in a client modem 140, are coupled to the same twisted wire pair 130 along with the DC power. At block 204, the DC power and electrical data communications are transmitted, driven or sent as a combined electrical WAN signal though WAN port 129 across the twisted wire pair 130 from the subscriber terminal 134 to the network element, such as ONU 110. At block 206, the driven DC power and electrical data communications are accepted or received at the network element over the same twisted wire pair 130. At block 208, the network element decouples the electrical data communications from the DC power, or vice versa, with a DAA device 124. At block 210, the network element provides the DC power to a DC-to-DC power converter 126 for conversion and for use by the network element in the network element's power supply 128. In the method described above, the power network and the information network become, and are, the same network. The DC power that is provided or supplied at the subscriber premise 104 for feeding the power need of the network element is assumed to be of sufficient DC current and DC voltage required for delivery to the network element. In many embodiments of the invention, this required DC current and DC voltage will be of a high level (e.g., −48 volts, −24 volts) that necessitates the use of a DC converter by the network element to convert the delivered DC power to a usable level (e.g., 5 volts, 3.3 volts) for use by the network element's component subsystems as distributed by the power supply 128 (e.g., 3.3 volts, 1.8 volts, or 0.9 volts).

In alternate embodiments of the invention, such as those providing primary telephony line services without the use of a traditional POTS line, an uninterruptible power source or battery backup 150 device may be required to continue to meet lifeline telephony regulatory obligations.

It will be appreciated that according to the method of an embodiment of the invention as described above, that with an increasing number of active subscribers the power needs of the network element, such as ONU 110, increases and so does the amount of supplied DC power with each active subscriber. The method provides a solution to match increasing power demands with additional power supplied remotely from each active subscriber in a progressive manner.

Figure 3:
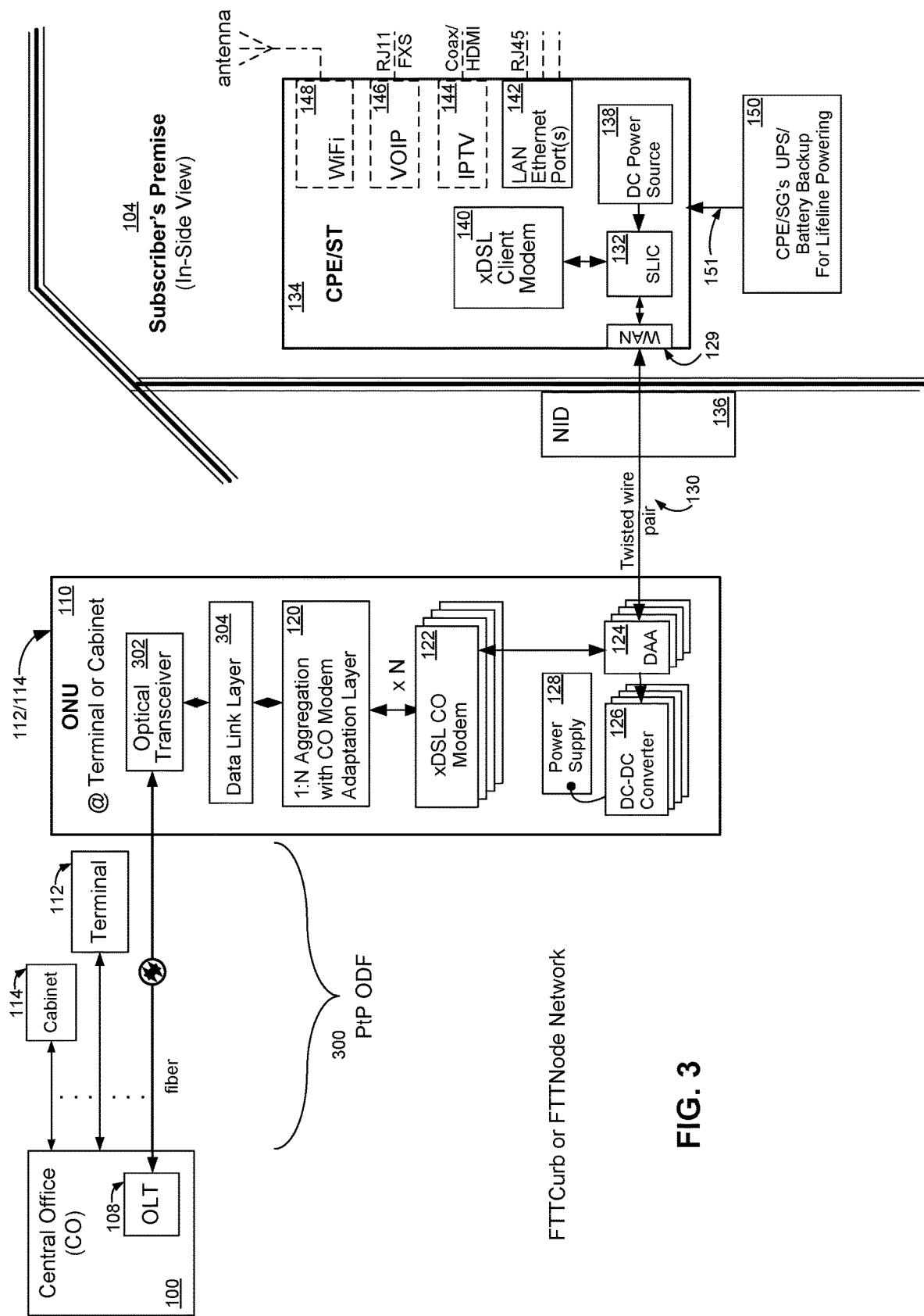
FIG. 3 is a block diagram illustration of a FTTC or FTTN point-to-point (PtP) optical wide area network with an ONU network element powered by a subscriber's CPE or ST using a single twisted wire pair wire, in accordance with an embodiment of the present invention.

Referring to FIG. 3 in view of FIG. 1*a*, a FTTC or FTTN network is shown wherein the implementation of the network is a point-to-point (PtP) fiber optic wide area network. The ODF 300 lacks passive splitters and illustrates the one-to-one direct connection between terminals 112 and cabinets 114 and the CO 100. Such PtP networks may be implemented by a point-to-point gigabit or 10 gigabit Ethernet network (e.g. active Ethernet communication network) with complementary components such as optical transceiver 302 and data link layer 304 in accordance with whatever specific protocol is chosen for the network implementation (e.g., Ethernet). The optical transceiver 302 may be plugged into or comprise an optical port or socket, the optical port serving as a site for coupling to a fiber and for performing the O/E and E/O conversions. Some embodiments of network elements may be made without optical transceivers, however having an optical port for later installation of an optical transceiver. In embodiments of network elements made with an optical transceiver, the optical port and the optical transceiver are essentially the same. Some form factors for optical transceiver 302 include, but not limited to, SFF, SFP, SFP+, and XFP. Additionally some embodiments may use dual fibers for communications with the CO, head-end or OLT. FIG. 3 serves to show that the method of an embodiment of the invention as previously described, as in FIG. 2, is a method apathetic and even naïve of the design choice or implementation of the fiber in the loop network. The method works equally well for both PtP networks and PONs.

Figure 4:
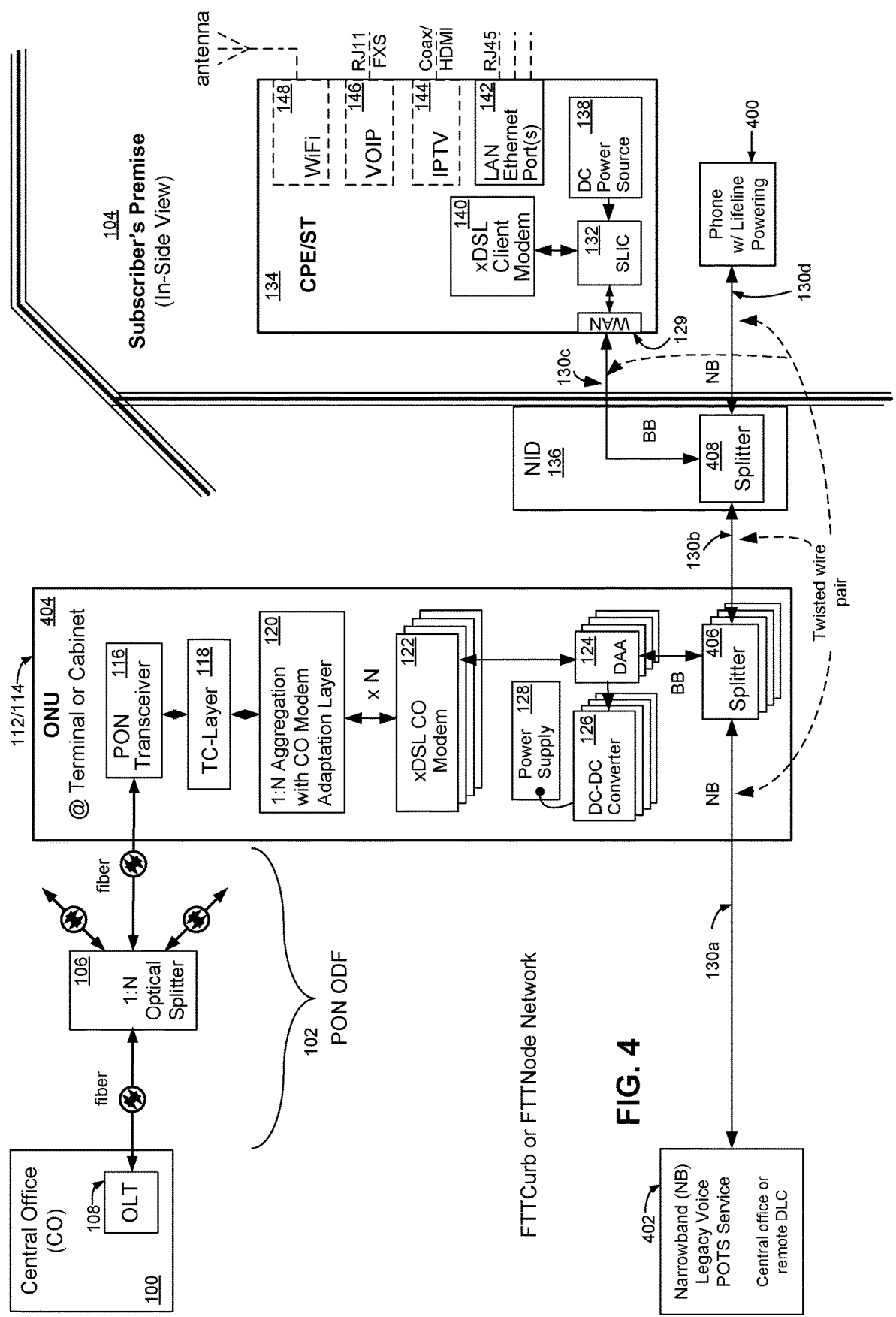
FIG. 4 is a block diagram illustration of a FTTC or FTTN point-to-multipoint PON with an ONU network element powered by a subscriber's CPE or ST using a single twisted wire pair while CO provides Lifeline powering across same twisted wire pair, in accordance with an embodiment of the present invention.

Referring to FIG. 4 in view of FIG. 1*a*, an alternative embodiment in accordance with the present invention is illustrated wherein the primary telephony line service 400 is served by legacy POTS from a CO or remote Digital Loop Carrier (DLC) network 402. Traditionally, a CO or DLC 402 is the sole power source for legacy POTS lines; however in this embodiment the SLIC 132 provides the DC power to twisted wire pair 130*b*, 130*c*, and 130*d* transmission line. Twisted wire pair transmission line 130*a* is connected to the CO or DLC 402 to a network element, such as ONU 404. ONU 404 additionally comprises a splitter 406 that combines the POTS service with the electrical CO modem 122 communications together on the same twisted wire pair 130*b* through an electrical port or socket (e.g., RJ-11). The splitter 406 places the POTS service at a lower and more narrow frequency (termed narrowband NB) than the xDSL modem communications which utilize higher frequencies to achieve greater bandwidth for data communications (termed broadband BB). In this embodiment a section of the twisted wire pair 130*b* transmission line carries POTS (NB) signal, xDSL modem electrical communications (BB) and the DC power (both a DC current and a DC voltage). This section of twisted wire pair 130*b* lies between and connects the ONU 404, through a second electrical port or socket (e.g., RJ-11) to the NID 136 of a subscriber premise 104. At the NID 136, another splitter 408 filters or separates the POTS NB signal and the xDSL modem electrical communications BB providing the NB signal to connect the subscriber's primary telephone line service 400 and providing the BB signal to the SLIC 132.

It will be appreciated that in this embodiment of the invention an uninterruptable power supply (UPS) or battery backup source is not required. If a subscriber suffers a power outage, the CPE/ST 134 will be without power and thus broadband communications will be down as well. This is tolerable since the outage will cause powered equipment such as TVs and the subscriber's LAN to be down as well. The CPE/ST 134 will not be able to provide DC power to the twisted wire pair. The CO or DLC 402 routinely monitors conditions on the twisted wire pair transmission line and sensing a loss of power on the line can provide the necessary DC power to continue providing POTS services such as primary telephony line service 400.

Figure 5:
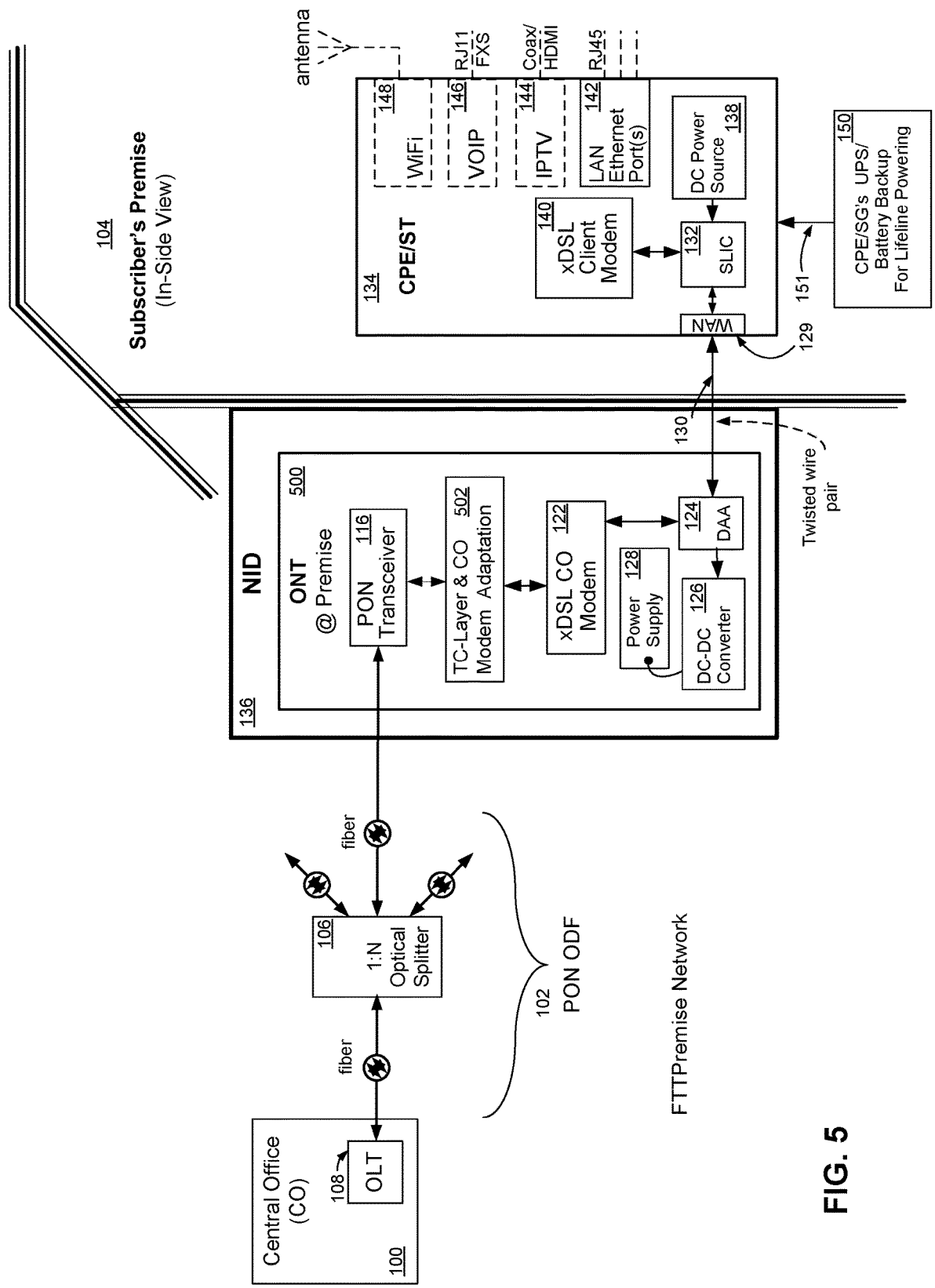
FIG. 5 is a block diagram illustration of a Fiber-to-the-Premise (FTTP) point-to-multipoint PON with an ONT network element powered by a subscriber's CPE or ST using a single twisted wire pair wire, in accordance with an embodiment of the present invention.

Referring to FIG. 5 in view of FIG. 1*a*, in which another alternative embodiment in accordance with the present invention is illustrated wherein the fiber in the loop network is a FTTP or Fiber to the Home (FTTH) network and the subscriber-powered network element is an ONT 500 at or near the NID 136. The ONT 500 does not support multiple subscriber premises thus aggregation methods are not necessary in the TC-Layer and CO modem adaptation device 502 and only a single DAA 124, xDSL CO modem 122 and DC-to-DC converter 126 are required to perform a method of an embodiment of the invention. The FTTP or FTTH network illustrated in FIG. 5 is a passive optical network (PON). If primary telephone service line is to be provided by the FTTP or FTTH network then a UPS/battery backup source 150 for the CPE/ST 134 may be required for life-line regulatory obligations.

Figure 6:
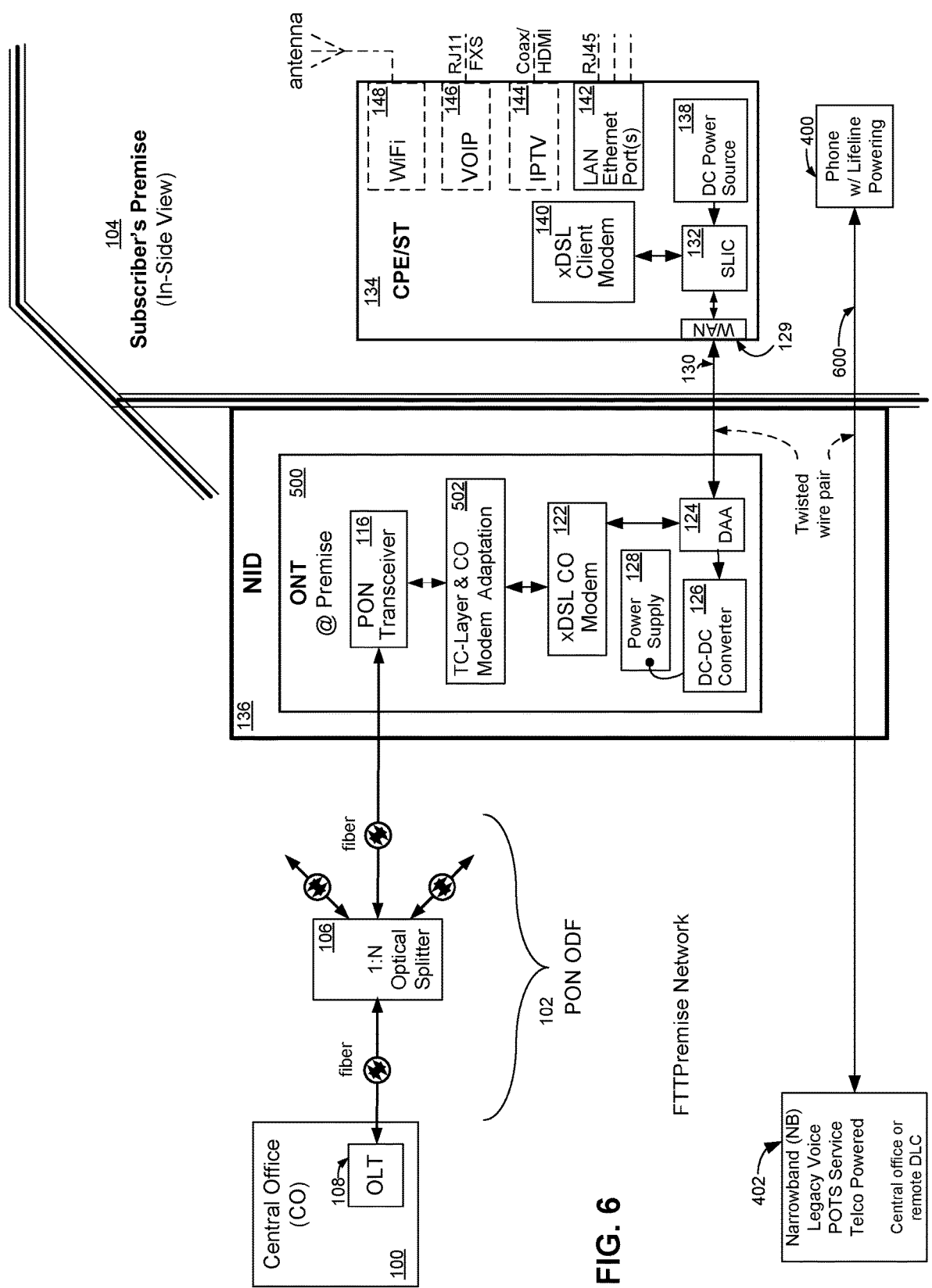
FIG. 6 is a block diagram illustration of a FTTP point-to-multipoint PON with an ONT network element powered by a subscriber's CPE or ST using a single twisted wire pair with the CO providing Lifeline powering for Plain Old Telephone Service (POTS) using a second twisted wire pair wire, in accordance with an embodiment of the present invention.

Referring to FIG. 6 in view of FIG. 5, in which yet another alternative embodiment in accordance with the present invention is illustrated wherein the FTTP or FTTH does not provide a primary telephone service line. In this embodiment the POTS services provided by a CO or DLC 402 pass through the NID 136 with no splitting and on a separate twisted wire pair 600 from the twisted wire pair 130 which provides broadband services to the subscriber premise 104 and provides subscriber power to the ONT 500 as previously described and indicated.

Figure 7A:
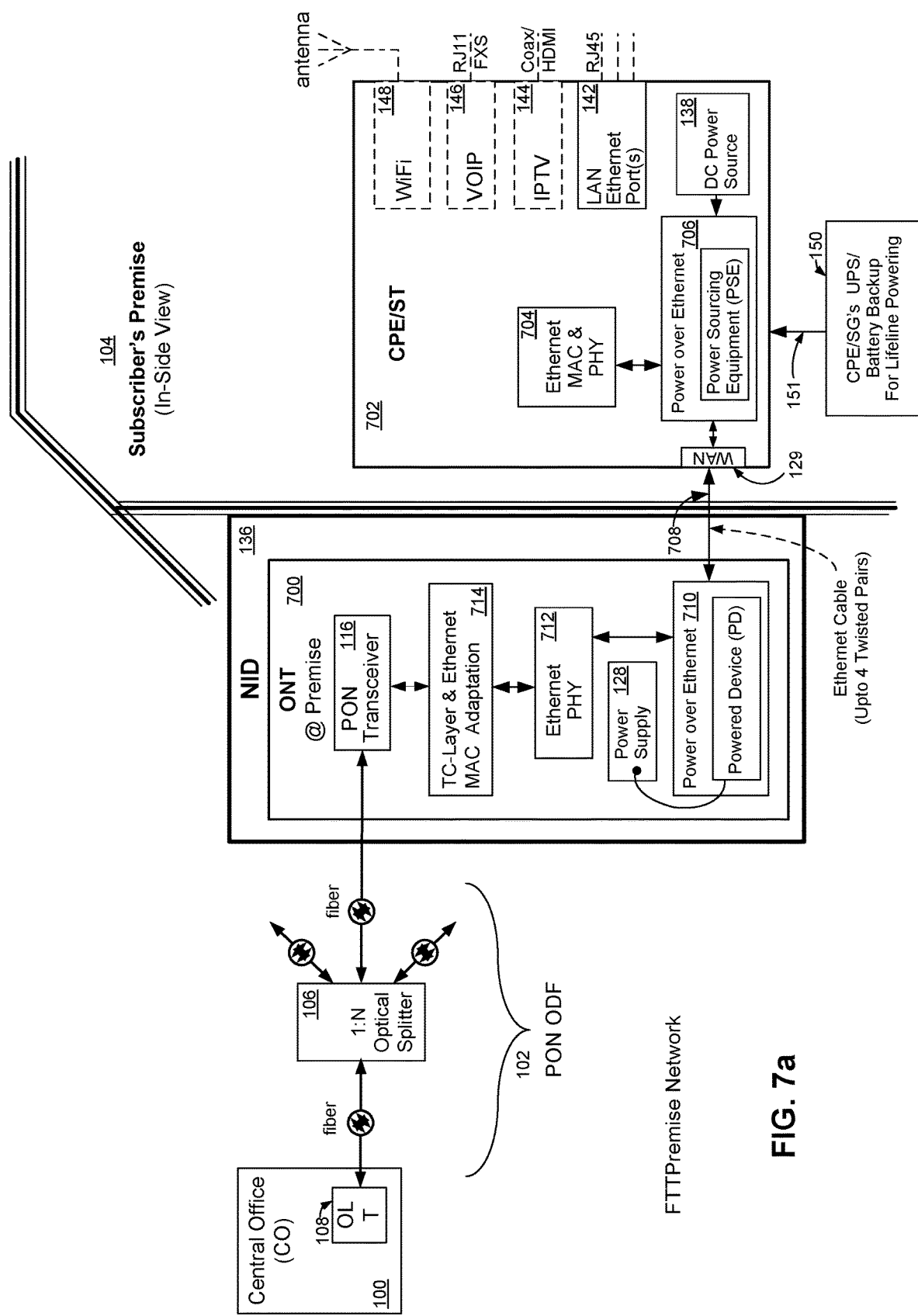
FIG. 7a is a block diagram illustration of a FTTP point-to-multipoint PON with an ONT network element powered by a subscriber's CPE or ST using Power over Ethernet (PoE) over a single Ethernet cable, in accordance with an embodiment of the present invention.

Referring to FIG. 7a in view of FIG. 1a, an alternative embodiment in accordance with the present invention is illustrated wherein a FTTP or FTTH network is shown with a subscriber-powered ONT 700, which is powered by Power over Ethernet (PoE). The FTTP or FTTH network shown being a passive optical network (PON) implementation. PoE is defined by the IEEE 802.af specification (hereby included by reference) and defines a way to build Ethernet power-sourcing equipment and powered device terminals in local area networks (LANs). The specification involves delivering 48 volts of DC power over unshielded twisted-pair wiring in LANs. It works with existing LAN cable plant, including Category 3, 5, 5e or 6; horizontal and patch cables: patch-panels; outlets; and connecting hardware, without requiring modification.

A CPE/ST 702 comprising a communication device such as an Ethernet MAC and PHY 704 device is in electrical communication with a first Power over Ethernet (PoE) capable device 706. The PoE capable device 706 internally comprises an electrical coupling device such as a Power Sourcing Equipment (PSE) device in accordance with the 802.3af standard. The PSE electrical coupling device couples electrical Ethernet signals and DC power, which may be derived from subscriber mains power, provided by DC power source 138. The first PoE capable device 706 passes electrical Ethernet signals as well as DC power through WAN port 129 as a combined electrical WAN signal over Ethernet cable 708 to an electrical port or socket (e.g., RJ-45) at a second PoE capable device 710 in the ONT 700. The ONT 700 being at or near the NID 136. The second PoE capable device 710 comprises an electrical coupling device such as a Powered Device (PD) in accordance with the 802.3af standard. The second PoE capable device 710 is capable of decoupling the electrical Ethernet signals from the combined electrical WAN signal, which are then provided to a communication device such as the Ethernet PHY 712, and decouples DC power which is then provided to the ONT 700 power supply 128. The second PoE capable device 710 may contain a DC-to-DC converter to supply (not shown) the appropriate DC current and DC voltage needs of the ONT 700. The communication device Ethernet PHY 712 is in electrical communication with a TC-Layer and Ethernet MAC adaptation device 714 to complete the broadband communication flow and to indicate the differences in ONT 700 over previous ONT 500. The CPE/ST 702 is provided power during subscriber power outages by a UPS/battery backup 150 for lifeline powering requirements.

Figure 7B:
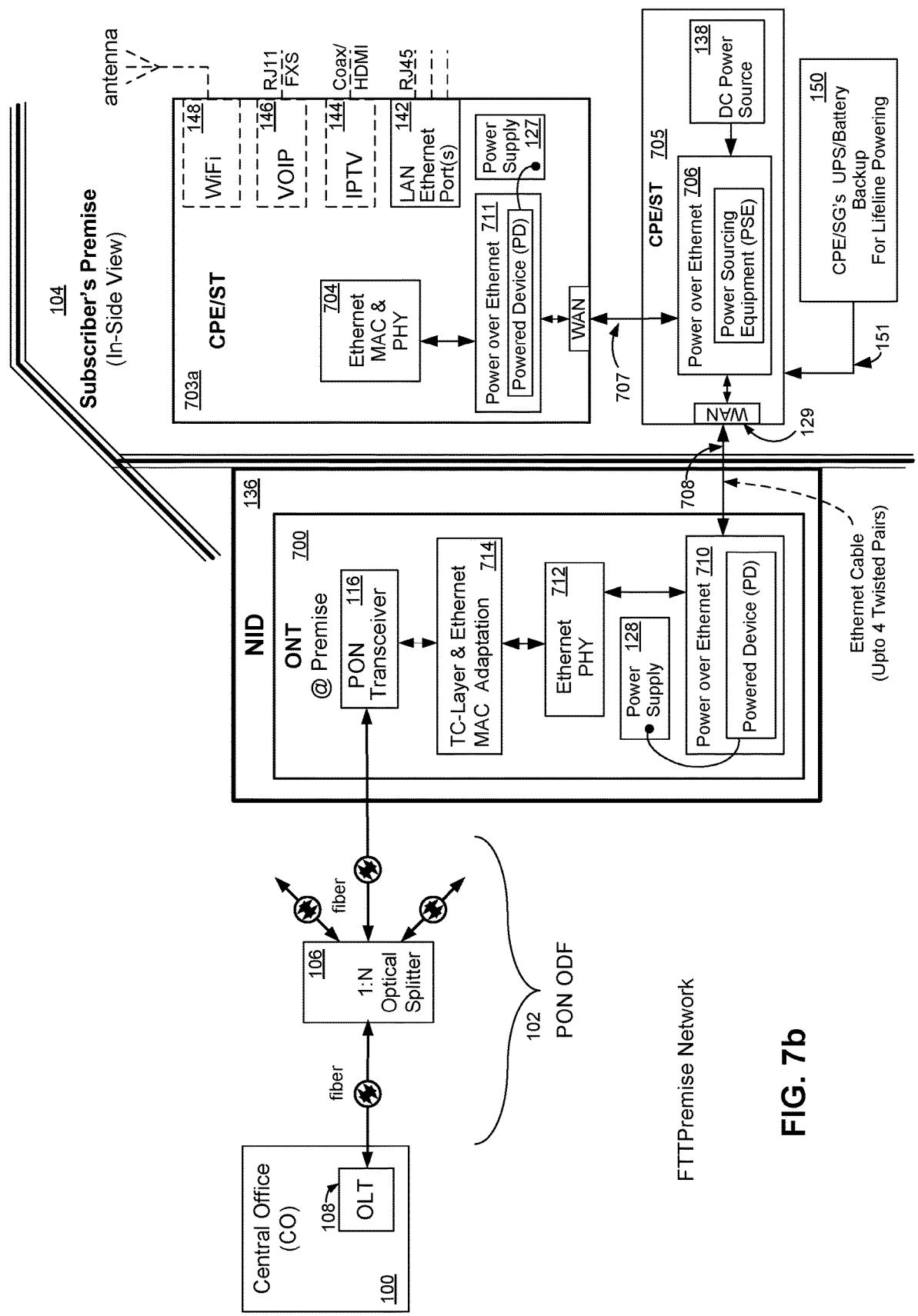
FIG. 7b is a block diagram illustration of a FTTP point-to-multipoint PON with an ONT network element and a CPE/ST powered by another CPE/ST using Power over Ethernet (PoE) over a single Ethernet cable, in accordance with an embodiment of the present invention.

Referring to FIG. 7b, an alternative embodiment of FIG. 7a is shown with a CPE/ST 705 comprising PoE capable device(s) 706 and DC power source 138. The CPE/ST 705 passes electrical Ethernet signals between CPE/ST 703a and ONT 700 via Ethernet cables 707 and 708 respectively as well as coupling DC power from the DC power source 138 onto 708 as a combined electrical WAN signal through WAN port 129. CPE/ST 705 is provided power during subscriber power outages by the UPS/battery backup 150 for lifeline powering requirements.

Figure 7C:
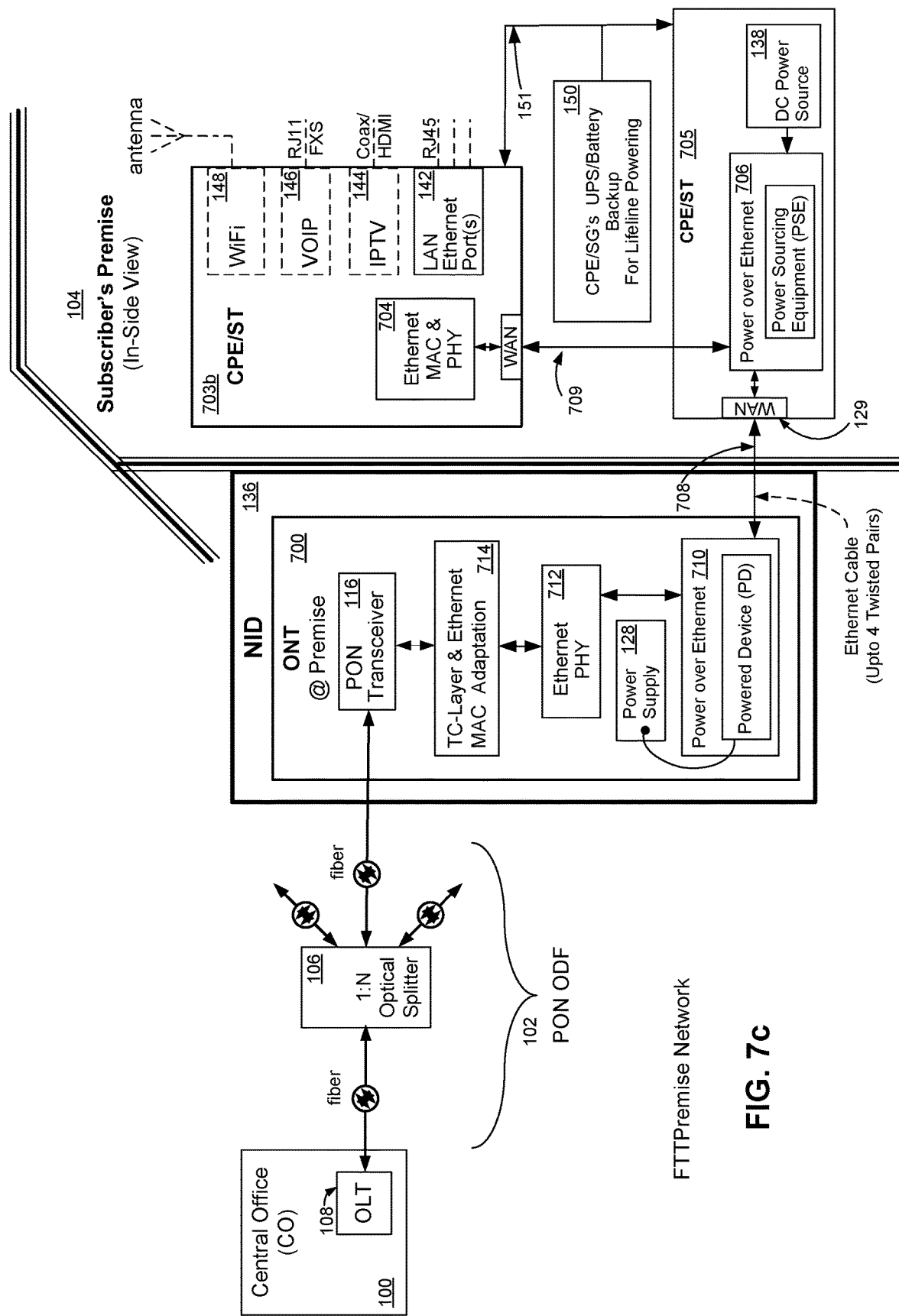
FIG. 7c is a block diagram illustration of a FTTP point-to-multipoint PON with an ONT network element powered a CPE/ST using Power over Ethernet (PoE) over a single Ethernet cable, in accordance with an embodiment of the present invention.

Referring to FIG. 7c, an alternative embodiment of FIG. 7b is shown with a legacy CPE/ST 703b that is not PoE capable. PoE capable device 706 passes electrical Ethernet signals from Ethernet MAC and PHY 704 via Ethernet cable 709 as well as DC power provided by DC power source 138 over Ethernet cable 708 as a combined electrical WAN signal through WAN port 129 to the second PoE capable device 710 in ONT 700. The CPE/ST 703b and CPE/ST 705 are provided power during subscriber power outages by the UPS/battery backup 150 for lifeline powering requirements.

Figure 8:
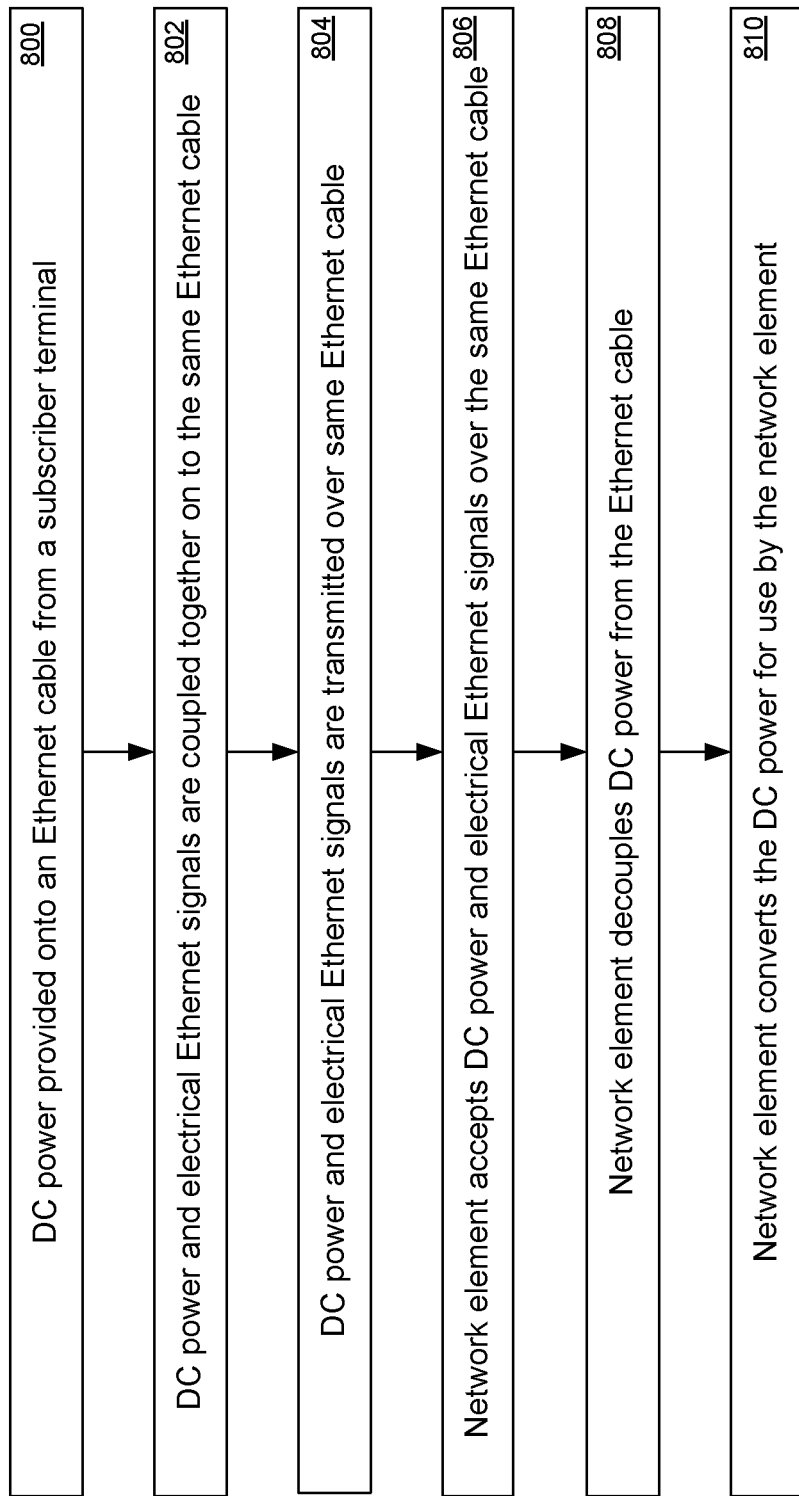
FIG. 8 is a flow chart illustration of a method of an embodiment of the present invention for powering a network element utilizing Power over Ethernet (PoE).

Referring to FIG. 8 in view of FIG. 7a, a flow chart of a method of an embodiment of the present invention utilizing PoE is illustrated. Powering a network element of a FTTP or FTTH network, such as ONT 700 in FIG. 7a, from a subscriber terminal 702 or 705 at a subscriber premise 104 entails providing or supplying a DC power, from DC power source 138 to PSE 706, onto a twisted wire pairs or Ethernet cable 708 from the subscriber terminal as indicated by block 800. At block 802, electrical Ethernet communications or signals from the Ethernet MAC and PHY device 704 are coupled to the same Ethernet cable 708 transmission line with the DC power. At block 804, the DC power and electrical Ethernet signals are transmitted, driven or sent as a combined electrical WAN signal through WAN port 129 across the Ethernet cable 708 transmission lines from the subscriber terminal 702 or 705 to the network element, such as ONT 700. At block 806, the driven DC power and electrical Ethernet signals are accepted or received at the network element over the same Ethernet cable 708. At block 808, the network element decouples the electrical Ethernet signals from the DC power, or vice versa with the second PoE capable device 710. At block 810, the network element performs DC-to-DC power conversion for use by the network element.

Figure 9A:
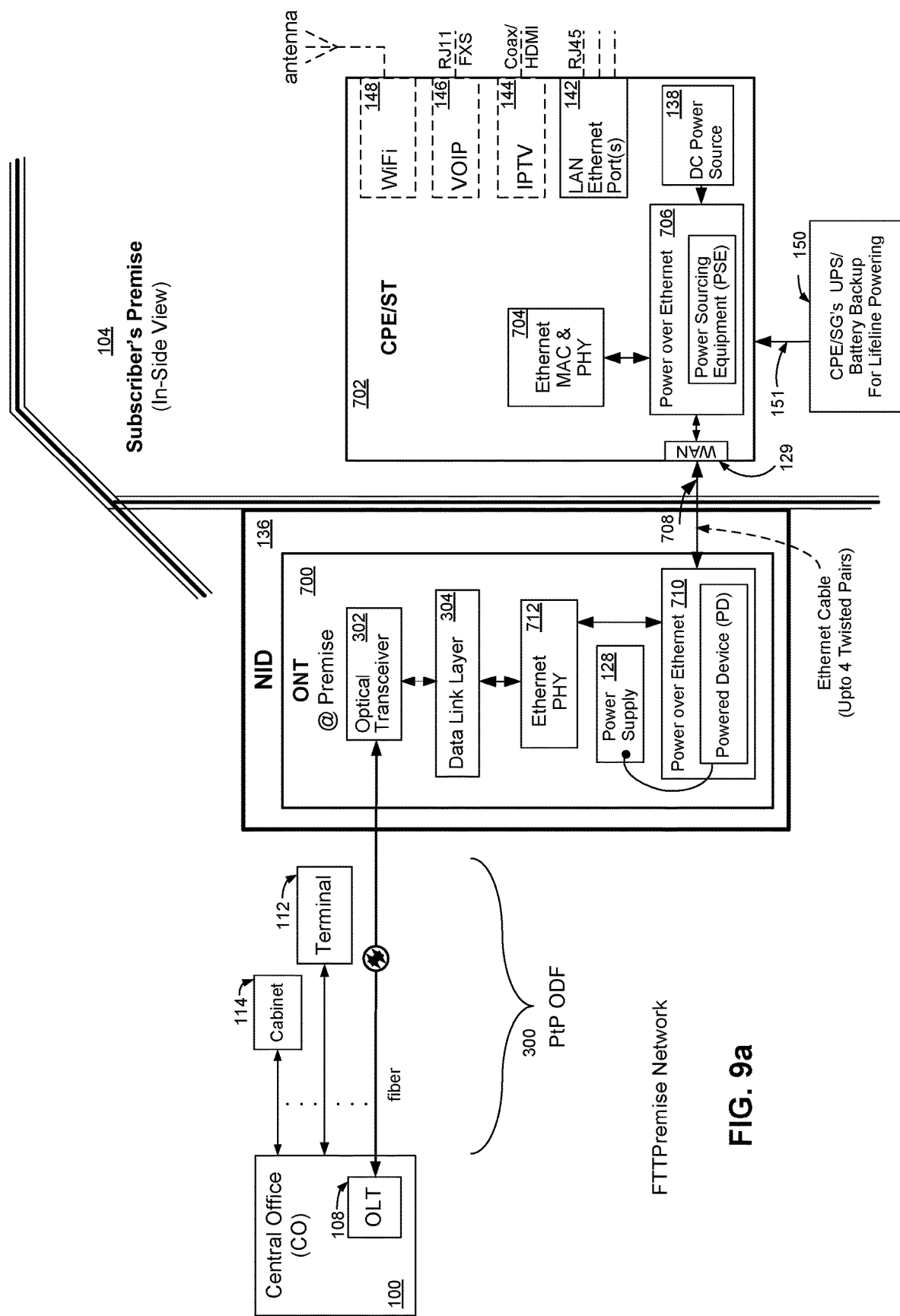
FIG. 9a is a block diagram illustration of a FTTP point-to-point optical network with an ONT network element powered by subscriber's CPE or ST using Power over Ethernet (PoE) over a single Ethernet cable, in accordance with an embodiment of the present invention.
Figure 9B:
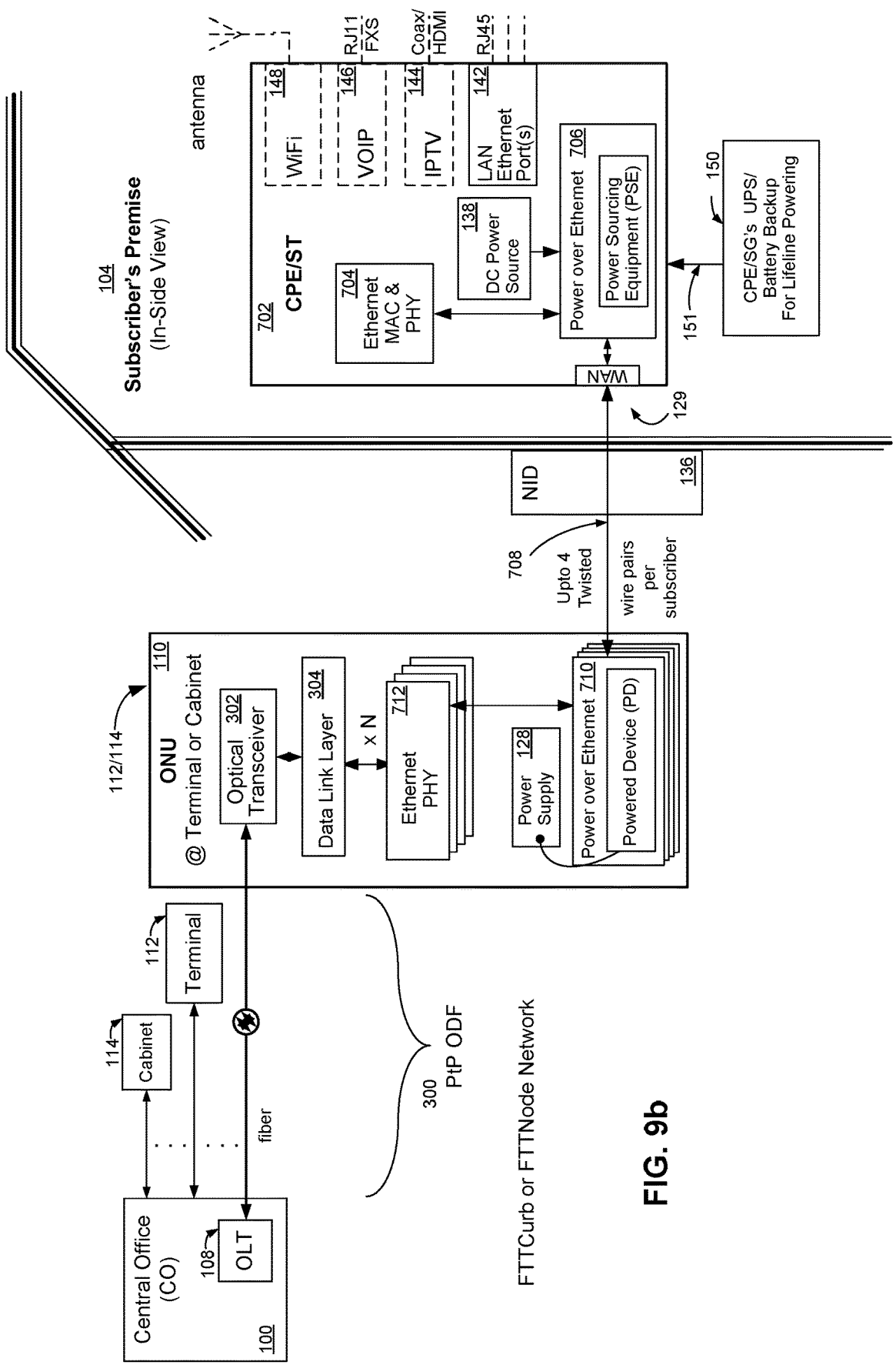
FIG. 9b is a block diagram illustration of a FTTP point-to-point optical network with an ONU network element powered by subscriber's CPE or ST using Power over Ethernet (PoE) over a single Ethernet cable, in accordance with an embodiment of the present invention.

Referring to FIG. 9a and FIG. 9b in view of FIG. 7a, a FTTP or FTTH network is shown wherein the implementation of the network is a point-to-point (PtP) fiber optic wide area network. The ODF 300 lacks passive splitters and illustrates the one-to-one direct connection between terminals 112, cabinets 114, NIDs 136 and the CO 100. Such PtP networks may be implemented by a point-to-point gigabit or 10 gigabit Ethernet network (e.g. active Ethernet communication network) with complementary components such as optical transceiver 302 and data link layer 304 in accordance with whatever specific protocol is chosen for the network implementation (e.g., active Ethernet). The optical transceiver 302 may be plugged into or comprise an optical port or socket, the optical port serving as a site for coupling to a fiber and for performing the O/E and E/O conversions. Some embodiments of network elements may be made without optical transceivers, however having an optical port for later installation of an optical transceiver. In embodiments of network elements made with an optical transceiver, the optical port and the optical transceiver are essentially the same. Some form factors for optical transceiver 302 include, but not limited to, SFF, SFP, SFP+, and XFP. Additionally some embodiments may use dual fibers for communications with the CO, head-end or OLT. FIG. 9a and FIG. 9b serve to show that the PoE exemplary embodiment of the invention as previously described, as in FIG. 8, is a method apathetic and even naïve of the design choice or implementation of the fiber in the loop network. The method works equally well for both PtP networks and PONs.

Figure 10:
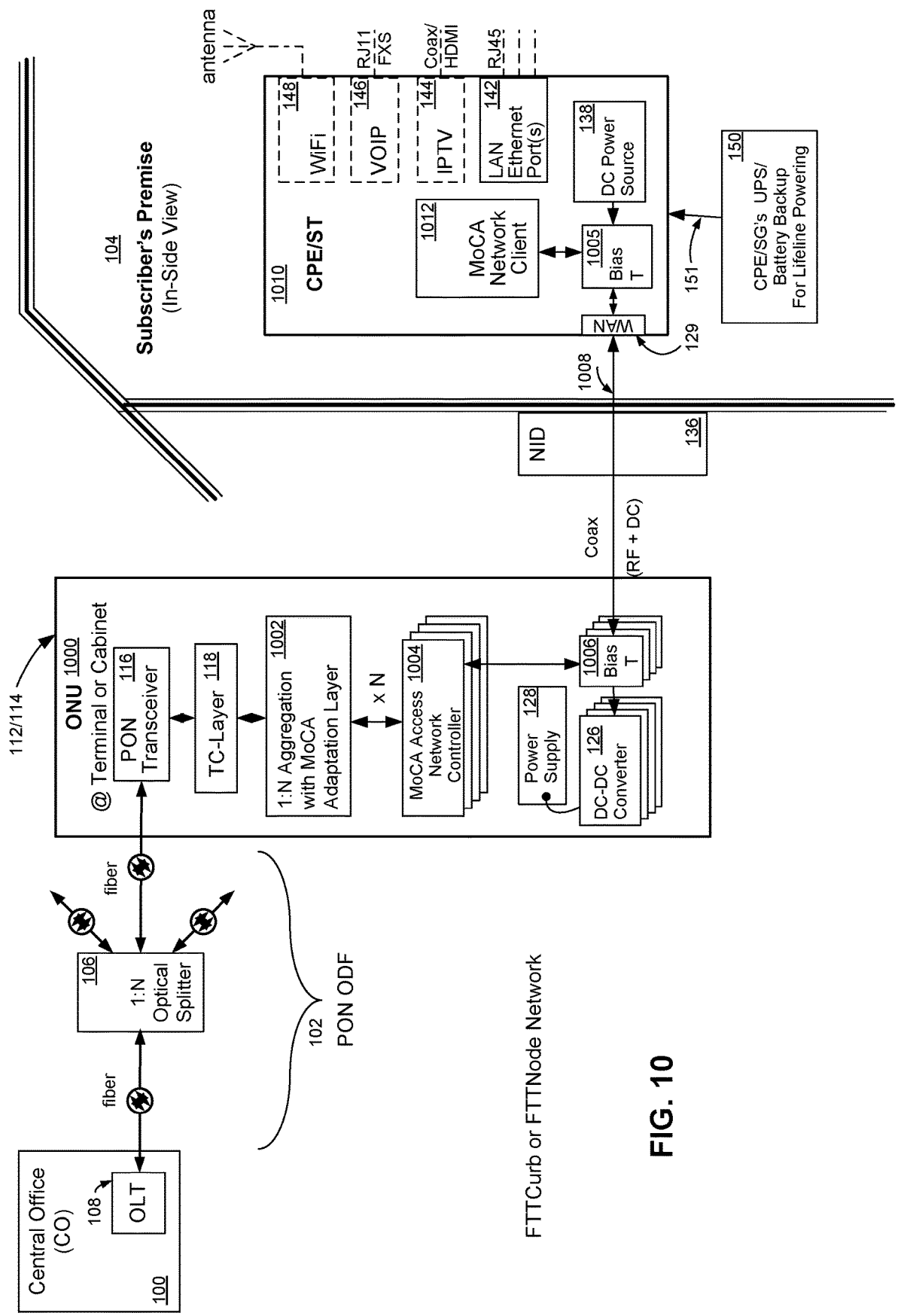
FIG. 10 is a block diagram illustration of a FTTC or FTTN point-to-multipoint PON with an ONU network element powered by a subscriber's CPE or ST using a coaxial cable, in accordance with an embodiment of the present invention.

Referring now to FIG. 10 in view of FIG. 1a, an alternative embodiment in accordance with the present invention is illustrated wherein a FTTC or FTTN network is shown with a subscriber-powered ONU 1000, which is in communication with a subscriber's terminal or CPE 1010 over a coaxial cable 1008 transmission line using communication devices such as Multimedia over Coax Alliance (MoCA) devices 1004/1012. The FTTC or FTTN network shown being a passive optical network (PON) implementation. MoCA is an industry driven specification for delivering networking, high-speed data, digital video, and entertainment services through existing or new coaxial cables in homes.

A CPE/ST 1010 comprising a communication device such as MoCA network client 1012 device is in electrical communication with an electrical coupling device such as first bias T device 1005. Bias T's are coaxial components that are used whenever a source of DC power is connected to a coaxial cable. The bias T does not affect the AC or RF transmission through the cable. The first bias T device 1005 couples MoCA electrical communication signals from MoCA Network Client 1012 with DC power from DC power source 138 as a combined electrical WAN signal though WAN port 129 and transmitted over coaxial cable 1008 through an electrical port (e.g., F-type or N-type connector) to another electrical coupling device such as second bias T device 1006 in the network element ONU 1000, the ONU 1000 being located away from the NID 136 and may serves a plurality of subscribers. The second bias T device 1006 is capable of decoupling the MoCA electrical communication signals, which is provided to a second communication device such as the MoCA access network controller device 1004, and decoupling DC power to the ONU 1000 DC-to-DC converter 126 from the combined electrical WAN signal on coaxial cable 1008. The DC-to-DC converter 126 supplying the appropriate DC current and DC voltage regulation and to the power supply 128, which distributes various voltage power-supply rails (e.g., 3.3 volts, 1.8 volts, or 0.9 volts) to ONU 1000's subsystem devices. The MoCA access network controller device 1004 is in electrical communication with a 1:N Aggregation with MoCA adaptation layer device 1002 that aggregates or multiplexes the broadband communication and service flows between the CO and subscribers. The CPE/ST 1010 is provided power during subscriber power outages by a UPS/battery backup 150 for lifeline powering requirements. In this way, a bias T device serves to inject and extract DC power to supply the powering needs of the ONU 1000 while combining MoCA signals on a same subscriber-powered coaxial cable 1008.

Figure 11:
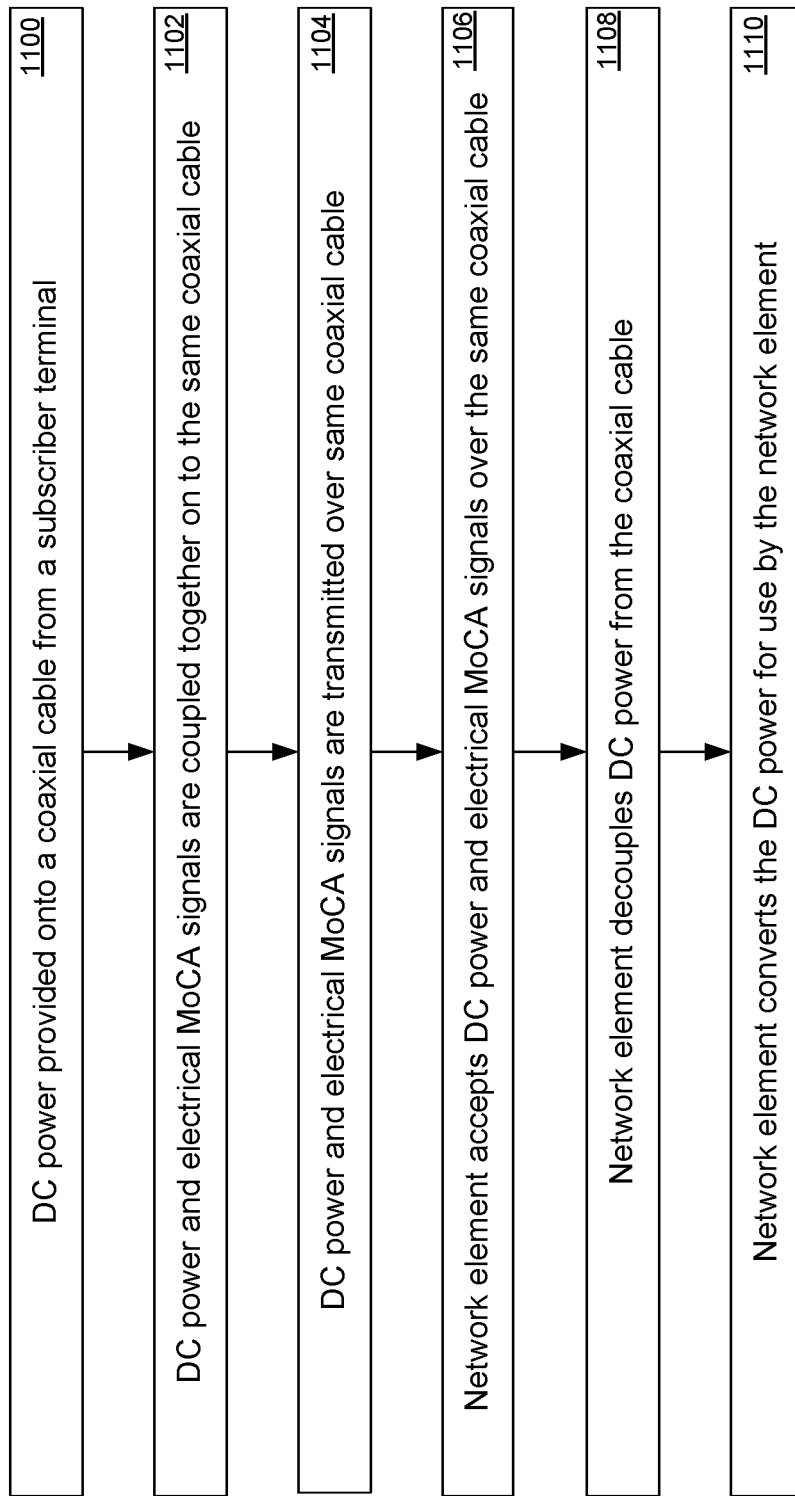
FIG. 11 is a flow chart illustration of a method of an embodiment of the present invention for powering a network element utilizing power over coaxial cable.

Referring to FIG. 11 in view of FIG. 10, a flow chart of a method of an embodiment of the present invention utilizing power over coax is illustrated. Powering a network element of a FTTC or FTTN network, such as ONU 1000 in FIG. 10, from a subscriber terminal 1010 at a subscriber premise 104 entails providing or supplying a DC power, from DC power source 138 to bias T 1005, onto a coaxial cable 1008 from the subscriber terminal as indicated by block 1100. At block 1102, electrical MoCA communications or signals from the MoCA network client device 1012 are coupled to the same coaxial cable 1008 with the DC power. At block 1104, the DC power and electrical MoCA signals are transmitted, driven or sent as a combined electrical WAN signal though WAN port 129 across the coaxial cable 1008 from the subscriber terminal 1010 to the network element, such as ONU 1000. At block 1106, the driven DC power and electrical MoCA signals are accepted or received at the network element over the same coaxial cable 1008. At block 1108, the network element decouples the electrical MoCA signals from the DC power, or vice versa with the second bias T device 1006. At block 1110, the network element performs DC-to-DC power conversion on the supplied and decoupled DC power for use by the network element.

Figure 12:
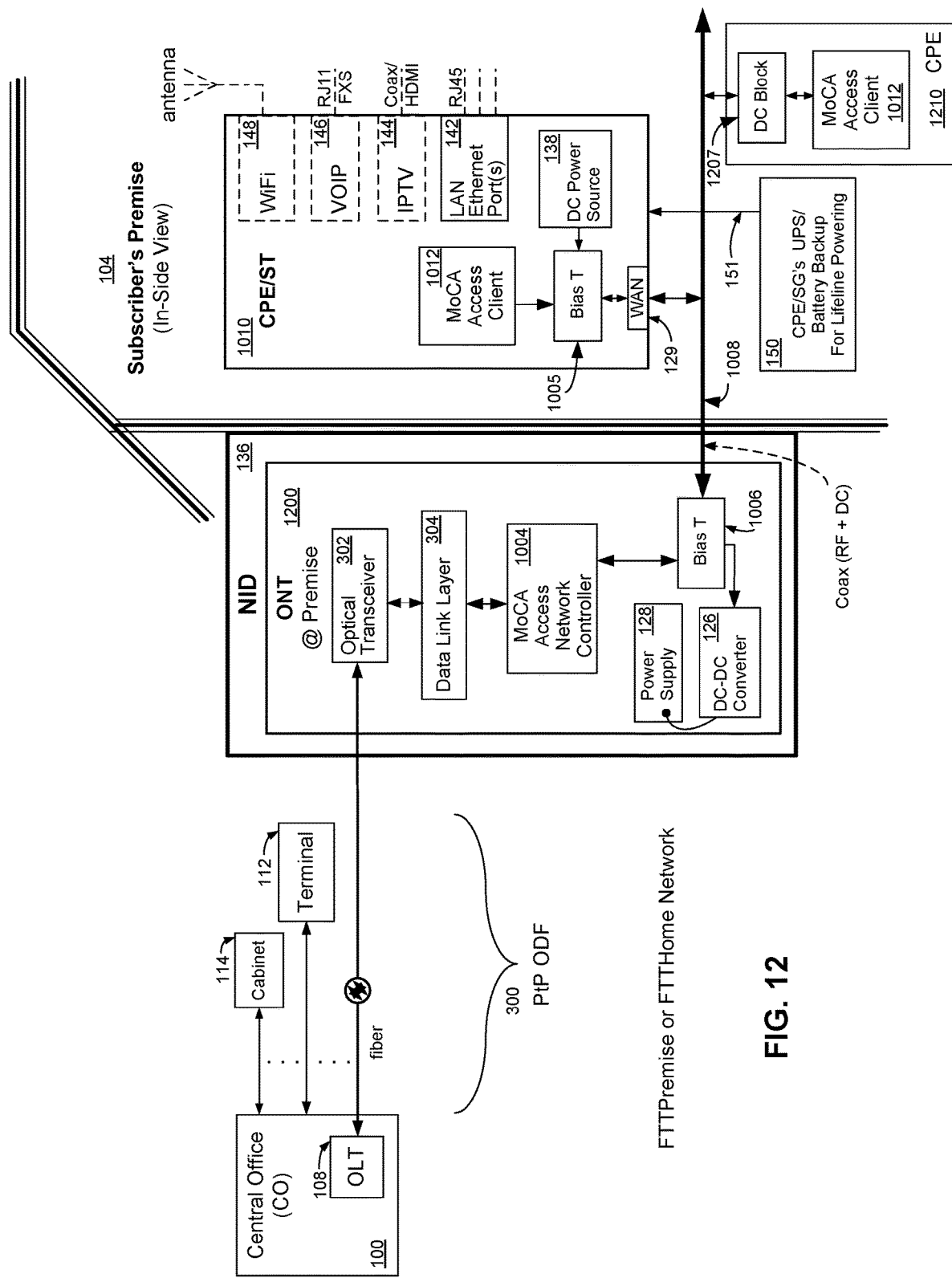
FIG. 12 is a block diagram illustration of a FTTP point-to-point optical network with an ONT network element powered by subscriber's CPE or ST using power over coaxial cable, in accordance with an embodiment of the present invention.

Referring to FIG. 12 in view of FIG. 10, an alternative embodiment in accordance with the present invention is illustrated wherein a FTTP or FTTH network is shown wherein the implementation of the network is a point-to-point (PtP) fiber optic wide area network. The ODF 300 lacks passive splitters and illustrates the one-to-one direct connection between terminals 112, cabinets 114, NIDs 136 and the CO 100. Such PtP networks may be implemented by a point-to-point gigabit or 10 gigabit Ethernet network (e.g. active Ethernet communication network) with complementary components such as optical transceiver 302 and data link layer 304 in accordance with whatever specific protocol is chosen for the network implementation. The optical transceiver 302 may be plugged into or comprise an optical port or socket, the optical port serving as a site for coupling to a fiber and for performing the O/E and E/O conversions. Some embodiments of network elements may be made without optical transceivers, however having an optical port for later installation of an optical transceiver. In embodiments of network elements made with an optical transceiver, the optical port and the optical transceiver are essentially the same. Some form factors for optical transceiver 302 include, but not limited to, SFF, SFP, SFP+, and XFP. Additionally some embodiments may use dual fibers for communications with the CO, head-end or OLT. FIG. 12 serves to show that the power over coax exemplary embodiment of the invention as previously described, as in FIG. 10, is a method apathetic and even naïve of the design choice or implementation of the fiber in the loop network. The method works equally well for both PtP networks and PONs. FIG. 12 also serves to illustrate the power over coax method with an ONT 1200 as well as to show compatibility with other MoCA capable CPE devices 1210 that share network communications with the MoCA access network controller 1004 on the same coaxial cable 1008, though such compatibility can be used with ONUs as well. FIG. 12 also serves to illustrate the use of an optical transceiver 302 and data link layer 304, in accordance with whatever specific protocol is chosen for the network implementation that does not need to perform 1:N aggregation or multiplexing of multiple MoCA connections. A DC block 1207 is used to isolate DC power while allowing data signals to pass through unaffected to allow use of other CPEs 1210 that do not provide DC power to the coaxial cable 1008. The DC block 1207 may be internal to the CPE 1210 or external (not shown). The CPE/ST 1010 is provided power during subscriber power outages by a UPS/battery backup 150 for lifeline powering requirements.

Figure 13A:
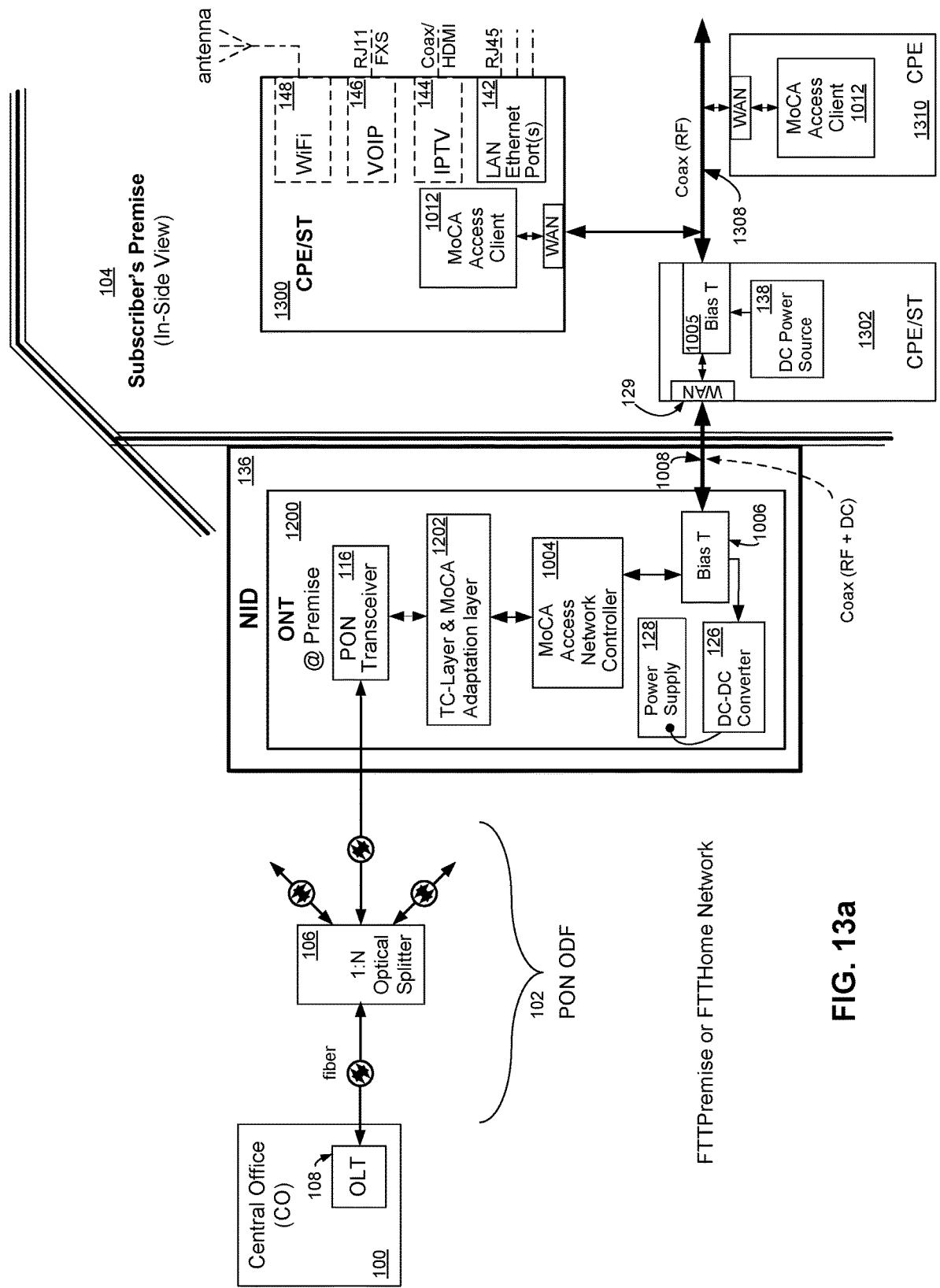
FIG. 13a is a block diagram illustration of a FTTP point-to-multipoint PON with an ONT network element powered by a subscriber's CPE or ST using a coaxial cable, in accordance with an embodiment of the present invention.

Referring to FIG. 13a in view of FIG. 12, an alternative embodiment of the invention using a FTTP or FTTH network is shown wherein the implementation of the wide area network is a PON 102. In this embodiment a CPE/ST 1302 comprising bias T 1005 and DC power source 138 is shown. The bias T 1005 of CPE/ST 1302 combines the MoCA or RF communications from coaxial cable 1308 onto coaxial cable 1008 transmission lines with DC power from the DC power source 138 as a combined electrical WAN signal though WAN port 129. The bias T device 1006 is capable of decoupling the MoCA or RF communication signals, which are then provided to the MoCA or RF access network controller device 1004, and decoupling DC power signal to the DC-to-DC converter 126 from coaxial cable 1008. The DC-to-DC converter 126 supplying the appropriate DC current and DC voltage regulation to the power supply 128 to distribute power at different voltage rails (e.g., 3.3 volts, 1.8 volts, or 0.9 volts) throughout all the ONT 1200 subsystem devices. This allows simplification and use of legacy (i.e., non-subscriber powered) CPE/ST devices 1300/1310 while providing subscriber-power from CPE/ST 1302 to the network element ONT 1200 over same coaxial cable 1008 used for communications.

Figure 13B:
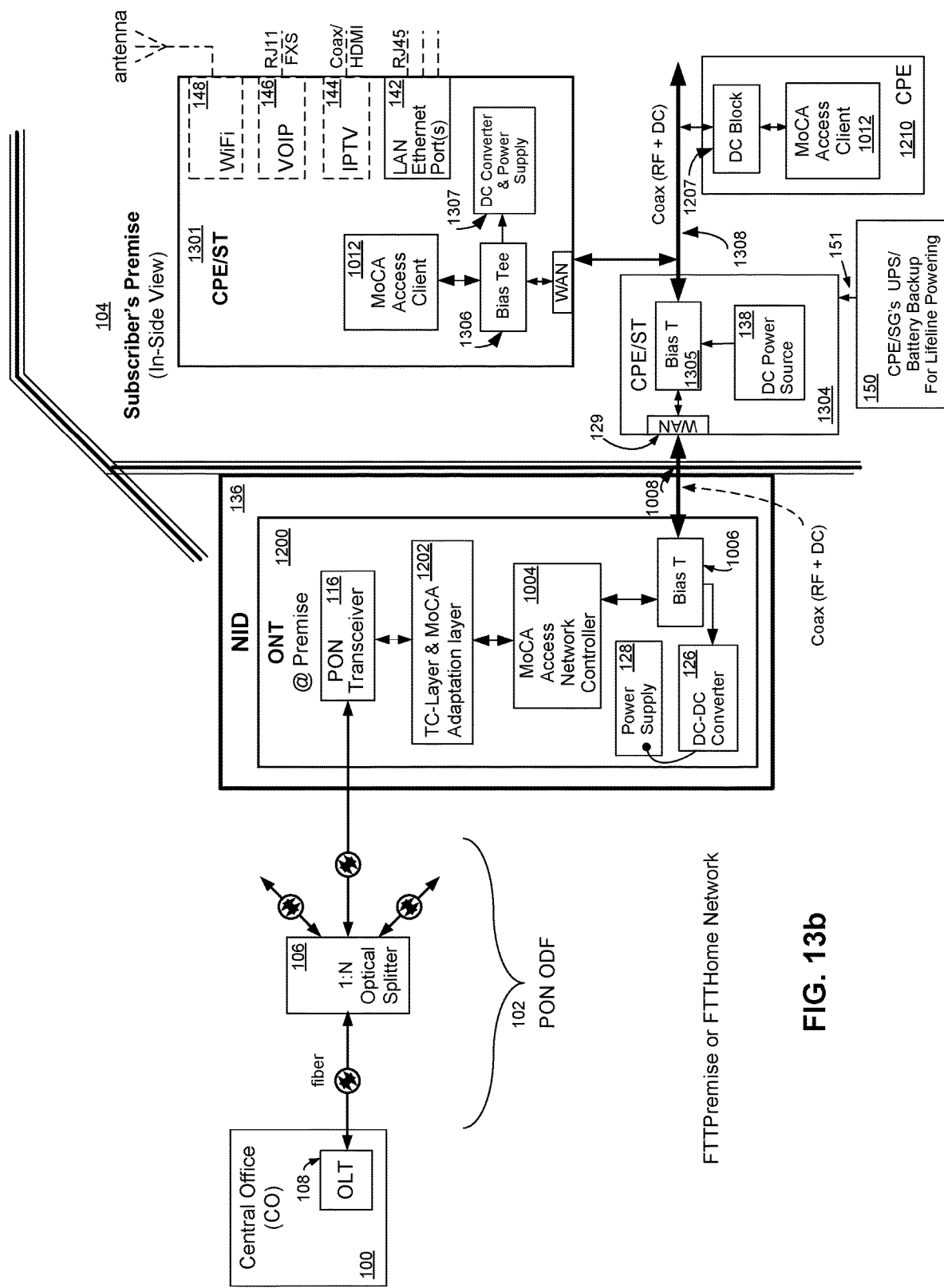
FIG. 13b is a block diagram illustration of a FTTP point-to-multipoint PON with an ONT network element powered by a subscriber's CPE or ST using a coaxial cable, in accordance with an embodiment of the present invention.

Referring to FIG. 13b in view of FIG. 13a, an alternative embodiment of the invention using a FTTP or FTTH network is shown wherein the implementation of the wide area network is a PON 102. In this embodiment a CPE/ST 1304 comprising bias T 1305 and DC power source 138 is shown and a UPS/battery backup source 150 for DC power source 138 is provided, which may be required for regulatory obligations. The bias T 1305 of CPE/ST 1304 combines the MoCA or RF communications from subscriber side coaxial cables 1308 and from network element side coaxial cable 1008 with DC power from the DC power source 138 and transmitted as a combined electrical signal on coaxial cables 1008 and 1308. CPE/ST 1301 has a bias T 1306 that decouples MoCA or RF communications and DC power from coaxial cable 1308. Bias T 1306 providing DC power to the CPE/ST 1301's power supply 1307 for distributing the appropriate voltage supply rails to all of CPE/ST 1301 electrical subsystems. The embodiment enables a CPE/ST, such as CPE/ST 1301, and a network element, such as ONT 1200, to be powered by a second CPE/ST, such as CPE/ST 1304, within the customer premise via the same coaxial cable transmission line used for network communications, such as coaxial cable 1008 and 1308.

Figure 14A:
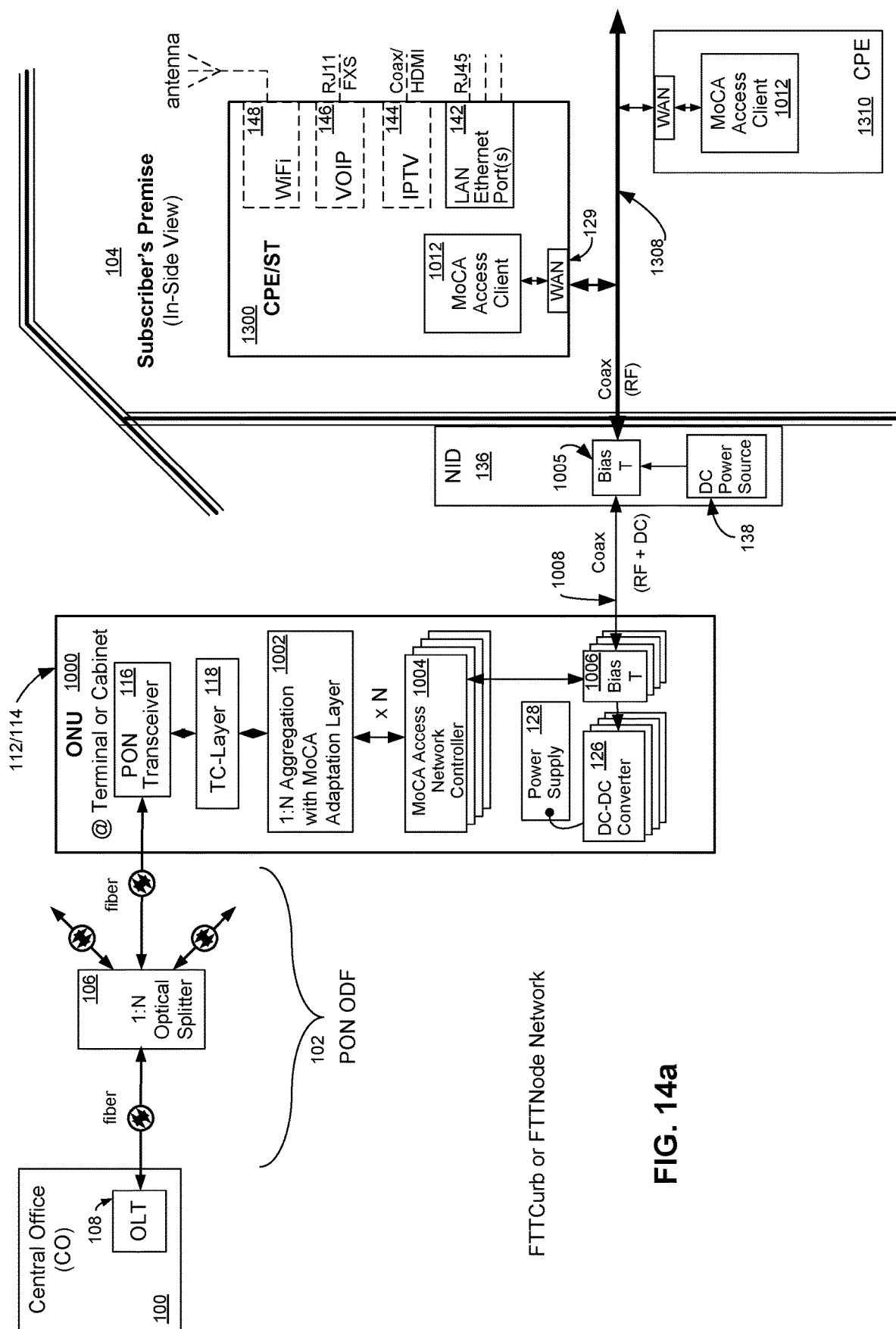
FIG. 14a is a block diagram illustration of a FTTC or FTTN point-to-multipoint PON with an ONU network element powered by a subscriber's CPE or ST using a coaxial cable, in accordance with an embodiment of the present invention.

Referring to FIG. 14a in view of FIG. 10, an alternative embodiment of the invention using a FTTC or FTTN network is shown wherein the implementation of the wide area network is a PON 102. In this embodiment the bias T 1005 and DC power source 138 are external to the CPE/ST 1300 and are located at or near the NID 136. The bias T 1005 combines MoCA or RF communications from subscriber side coaxial cable 1308 onto network element side coaxial cable 1008 with the DC power from the DC power source 138 as a combined electrical signal. This allows simplification of CPE/ST devices 1300/1310 and simplification of subscriber installation. Generally, power is not available at the NID 136; however power at the NID may be available in future Greenfield land (i.e., undeveloped land as opposed to Brownfield land) installations and this embodiment allows a network element, such as ONU 1000, to be powered from the NID with power derived from subscriber mains power via the same coaxial cable transmission line used for network communications, such as coaxial cable 1008 and 1308.

Figure 14B:
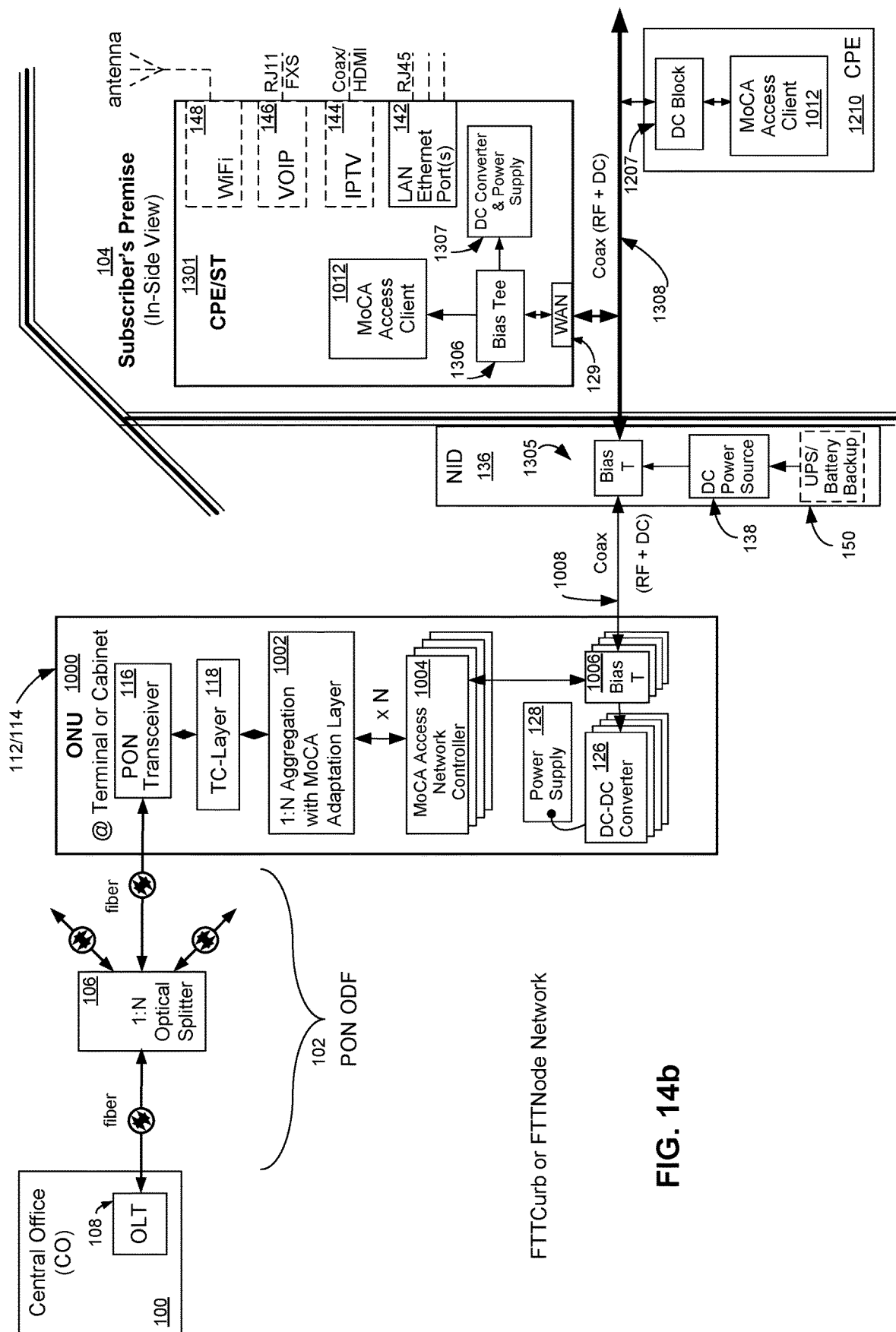
FIG. 14b is a block diagram illustration of a FTTC or FTTN point-to-multipoint PON with an ONU network element powered by a subscriber's CPE or ST using a coaxial cable, in accordance with an embodiment of the present invention.

Referring to FIG. 14b in view of FIG. 14a, an alternative embodiment of the invention using a FTTC or FTTN network is shown wherein the implementation of the wide area network is a PON 102. In this embodiment the bias T 1305, DC power source 138 and a UPS/battery backup source 150 are external to the CPE/ST 1301 and are located at or near the NID 136. The bias T 1305 combines MoCA or RF communications from subscriber side coaxial cables 1308 and network element side coaxial cable 1008 with the DC power from the DC power source 138 as a combined electrical signal. This allows simplification of subscriber installation as well as access for maintenance of the UPS/battery backup source 150 providing power during electrical power blackout enabling lifeline services. Additionally, this embodiment enables a CPE/ST, such as CPE/ST 1301, and a network element, such as ONU 1000, to be powered from the NID with power derived from subscriber mains power via the same coaxial cable transmission line used for network communications, such as coaxial cable 1008 and 1308.

In yet another alternative embodiment in accordance with the present invention, HomePNA is used as the communication method between an ONU/ONT and a plurality of subscriber terminal/CPEs. HomePNA is an industry standard for home networking solutions based on internationally recognized, open and interoperable standards that allow worldwide distribution of triple-play services, such as IPTV, voice and Internet data by leverage existing telephone wires (twisted wire pair) or coaxial cable transmission line. Thus, alternative embodiments of FIGS. 1-6 are possible substituting xDSL devices with HomePNA capable devices for subscriber powering network elements over twisted wire pairs as well as FIGS. 10-14b with substitution of MoCA devices with HomePNA capable devices for subscriber powering network elements over coaxial cable.

In yet another alternative embodiment in accordance with the present invention, ITU's G.hn is used as the communication method between an ONU/ONT and a plurality of subscriber terminal/CPEs. G.hn is yet another industry standard for home networking solutions based on internationally recognized, open and interoperable standards that allow worldwide distribution of triple-play services, such as IPTV, voice and Internet data by leverage existing telephone wires (twisted wire pair) or coaxial cable transmission line. Thus, alternative embodiments of FIGS. 1-6 are possible substituting xDSL devices with G.hn capable devices for subscriber powering network elements over twisted wire pair, and as well as FIGS. 10-14b with substitution of MoCA devices with G.hn capable devices for subscriber powering network elements over coaxial cable. A plurality of G.hn devices may be connected to the same subscriber-powered twisted wire pair 130 or subscriber-powered coaxial cable 1008.

While DC power is the preferred method of delivering power from a subscriber's premise to a network element, AC power is also possible. Alternate embodiments of FIGS. 1-6 and FIGS. 10-14b are possible with substitution of DC power with AC power. Alternate embodiments wherein elements such as: DC power source 138, 1307; DC-DC converter 126; DC block 1207; UPS backup 150 and electrical coupling devices such as: SLIC 132; DAA 124, 125; and bias T 1005, 1006, 1305, 1306 are appropriately substituted or designed with AC power in mind are also possible.

While UPS/battery backup 150 in various embodiments of the present invention have been shown to be an external device. Alternate embodiments with the UPS/battery backup 150 internal to the CPE, communication and/or power-coupling device are possible (not shown). Alternate embodiments with the UPS/battery backup 150 may be combined with DC power source 138. It will be appreciated by those skilled in the arts, that during lifeline powering events that network elements such as ONUs and ONTs and CPE/ST equipment may power down non-essential devices to extend the time that lifeline services can be provided. Such powering down events may also include reducing the line rates of communications.

It will be appreciated that in the various embodiments of the present invention the network elements such as ONU or ONT may have circuitry to measure their power usage (not shown). Additionally, alternative embodiments of the ONUs and ONTs with power measurement or metering circuitry may report their power usage back to the OLT or have their power meter or power measurement circuits reset, via the management or control channel with the OLT. Service Providers may use this information to reimburse subscribers for network element electricity usage and may reimburse government entities for related taxation regulations. In yet another alternative embodiment of the invention, an embodiment of a CPE or subscriber terminal may measure the amount of power supplied or injected over the transmission line between the subscriber terminal and the network element. The CPE or subscriber terminal may report the power supplied to the Service Provider or an affiliate via TR-069 or similar protocol.

It will be appreciated that while not shown, the subscriber terminal or CPE (e.g., CPE/ST shown in FIG. 1a, 1b, 3-7c, 9, 10, 13a-14b) may be a set-top box or may be incorporated into a television set (e.g., HDTV display). For example, a set-top box or a television incorporating an embodiment of the invention may power a service provider network element which provides services such as telephony, internet access, broadcast video, interactive video communications, and on-demand video. The set-top box, HDMI adaptor or high definition television (HDTV) may utilize G.hn communications and may be a slave G.hn device served by the service provider's network element serving as the master G.hn device controlling one or more slave G.hn based set-top box, HDMI adaptor or HDTV device.

It will also be appreciated that embodiments of the invention have the advantage of reducing installation labor time and cost. A significant portion of the time taken to connect subscribers to the Service Provider's network is the time and labor involved in provisioning power to the network element (e.g., ONU, ONT) and obtaining government or regulatory permits when the location of the network element requires deployment of new power-main connections and power supplying equipment. Since embodiments of the invention use the communication medium used to provide services (e.g., internet access, voice over internet protocol, broadcast TV, video conferencing) to also provide electricity to the network element, additional time and labor to power the network element is saved. Furthermore, self installation by subscribers is possible assuming a Service Provider has established service access to the premise (e.g., fiber connection or copper drop from a fiber). Self installation by a subscriber may be made as simple as plugging power into a wall outlet from the Service Provider provided or Subscriber purchased subscriber terminal (e.g., CPE, set top box, HDTV) and connecting the subscriber terminal to a wall phone jack or coaxial cable outlet. The reduction in installation labor time and cost may be significantly more than the cost of the network element (e.g., ONT) and the subscriber terminal. Additionally, Subscribers and Service Providers benefit from the ease of installation associated with embodiments of the invention due to the reuse of existing premise wiring which may preclude the deployment of new subscriber-premise overlay wiring that may compromise, during installation, the integrity of the subscriber premise thermal insulation, natural gas lines, sewer lines and mains power lines.

Figure 15A:
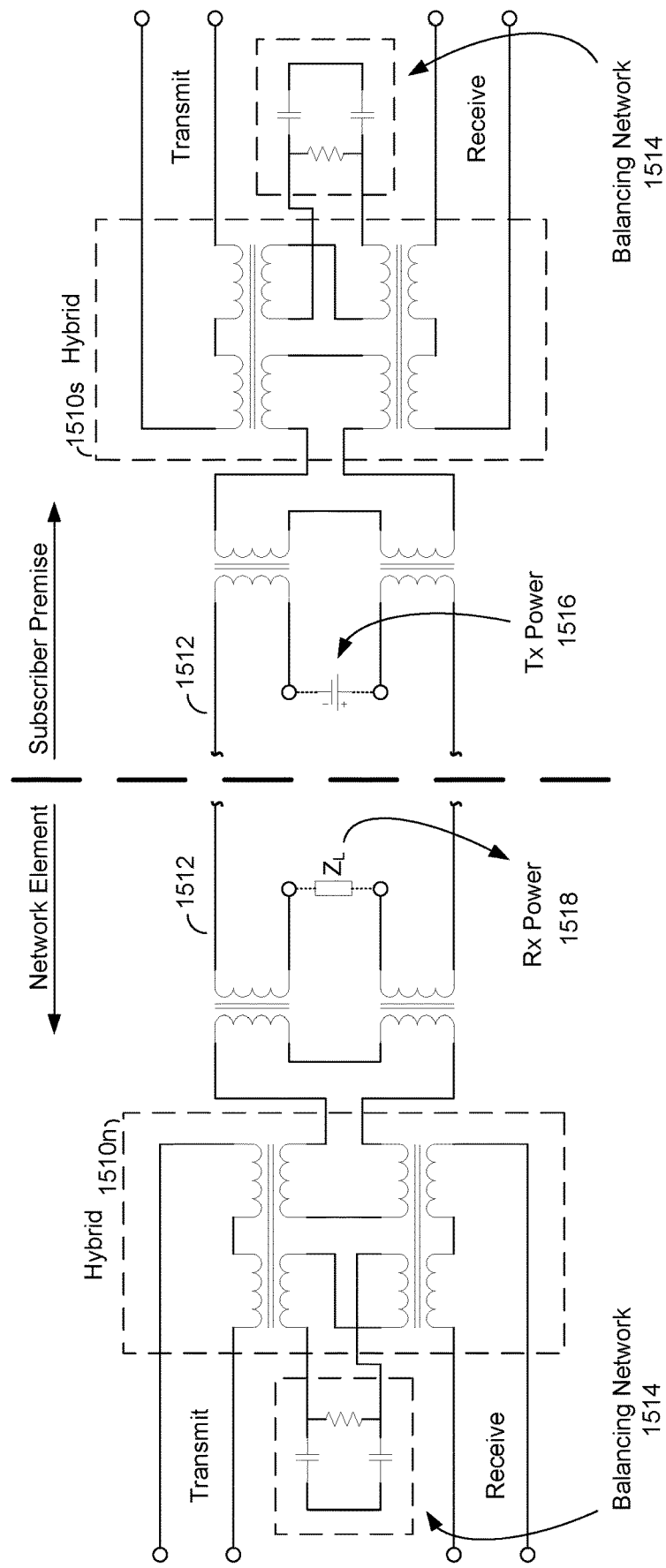
FIG. 15a is an illustration of an exemplary circuit model of an electrical coupling device for combining data communications and electrical power.

FIG. 15a is an exemplary illustration of a circuit model of an electrical coupling device for coupling data communications and electrical power between a subscriber terminal and a network element. The circuit model uses hybrid transformers 1510n, 1510s to couple four-wires onto two-wire transmission lines for full duplex communications, wherein transmit and receive communication signals each comprise a pair of conductors (e.g., four wires total) as does the transmission line (i.e., two conductors) 1512 and communication signals pass through the transformers with minimal loss. The hybrid transformer 15010n, 1510s blocks or cancels out transmit signals from appearing at the receive port as well as blocks or cancels out receive signals from appearing at the transmit port thus enabling full duplex communications. A balancing network 1514 is a circuit comprising of capacitance and resistance and sometimes inductance, forming a complex impedance network as transmission lines are not purely resistive but rather a complex impedance causing both the amplitude and phase to vary as signal frequencies vary. The electrical power signal is also injected onto 1516 and recovered 1518 from the transmission line 1512 via center-tapped transformers and $Z_L$ is representative of the load of the network element. Equivalent circuits may be produced that, as previously mentioned, are transformer-based, optically-based, capacitively coupled-based, active silicon/integrated circuit-based (e.g., transistors, op-amps), or some combination thereof. Additional circuits or their equivalents for electrical protection and isolation (e.g., isolation transformer, low frequency blocking capacitors, common mode choke), AC-to-DC conversion (e.g., bridge rectifier, reservoir capacitor), transmit and receive signal filtering (e.g., capacitive, inductive and resistive elements) and device detection circuits to determine when a network element is attached or removed from the transmission line (e.g., methods utilizing a low level current) may also be included in embodiments of the invention. Additionally, modulators or mixers, low noise amplifiers and additional signal filters can be employed in embodiments to adjust the frequency of communication signals (e.g., xDSL, Ethernet, MoCA, G.hn) as well as the voltage and current characteristics over the frequency of the electrical power signal.

Figure 15B:
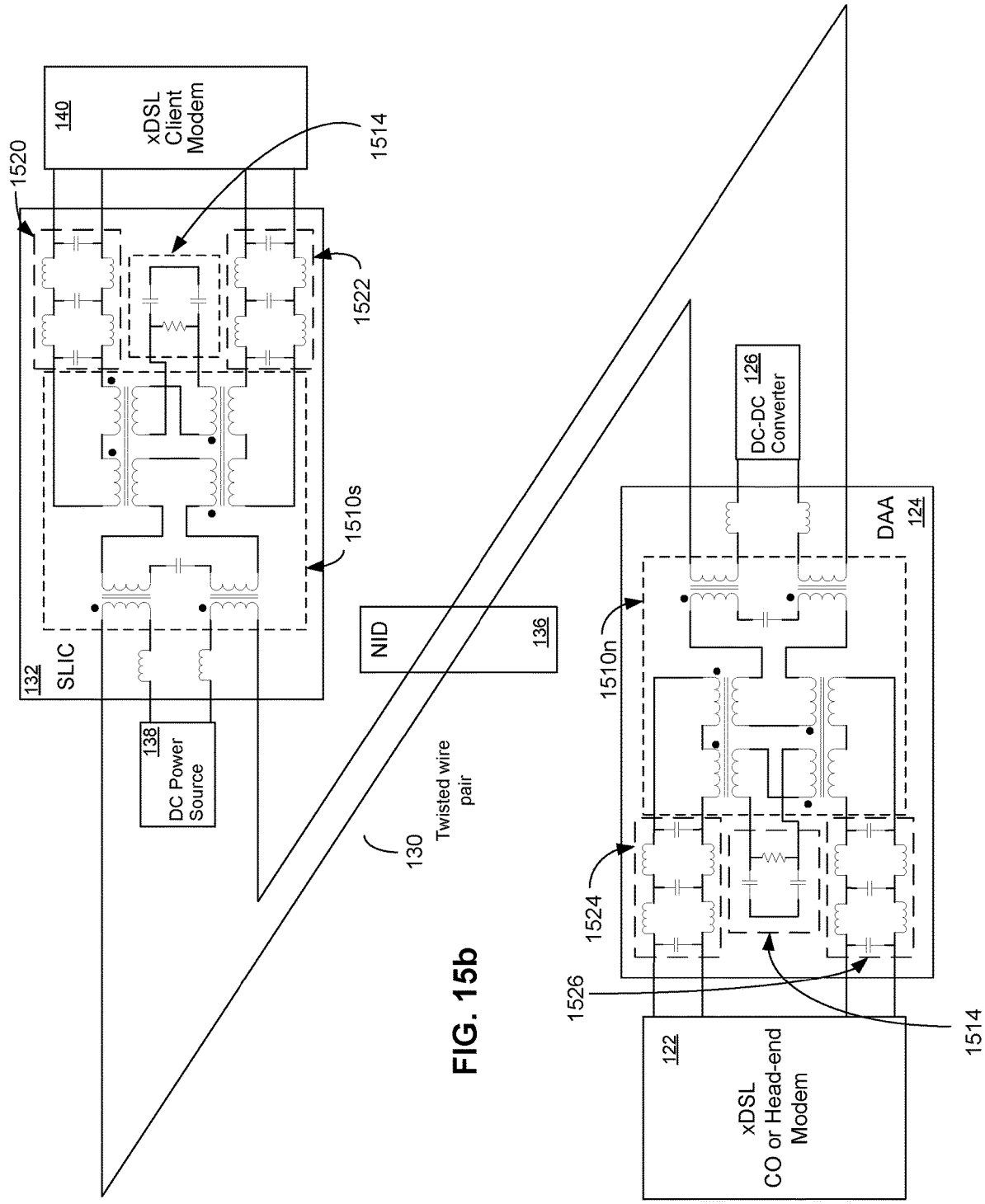
Figure 15C:
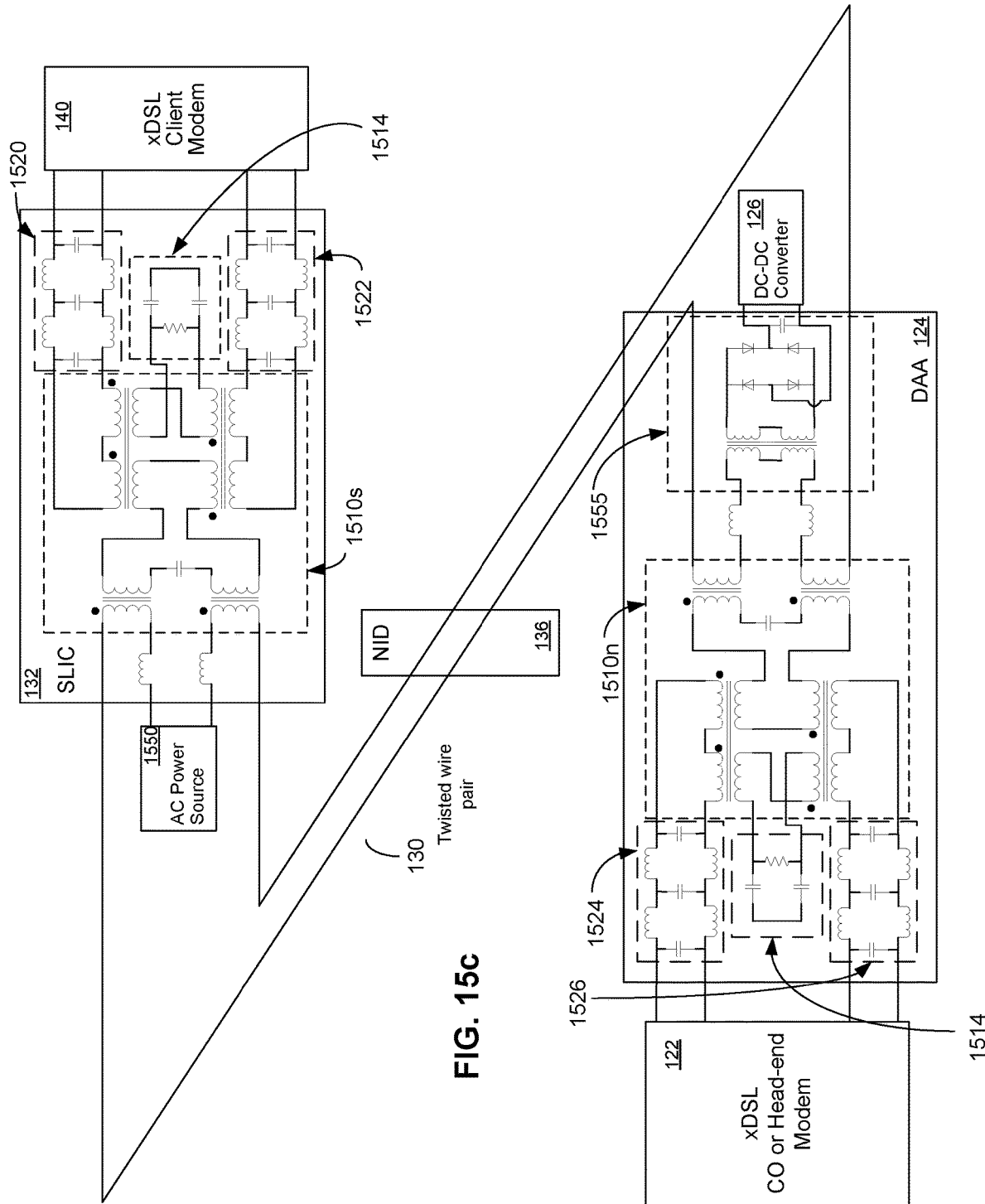

Referring now to FIG. 15b in view of FIG. 15a and FIG. 1a, an exemplary illustration of a circuit model of an electrical coupling device for coupling data communications and DC electrical power between the subscriber terminal 104 and the network element ONU 110 of FIG. 1a is shown. xDSL client modem 140 is coupled to SLIC 132 comprising of transmit signal filter 1520, receive signal filter 1522 and transmission line hybrid coupling circuit 1510s. A DC power source 138 is coupled to SLIC 132 and SLIC 132 also couples to twisted wire pair 130. xDSL CO or Head-end modem 122 is coupled to DAA 124 comprising of transmit signal filter 1524, receive filter 1526 and transmission line hybrid coupling circuit 1510n. DAA 124 decouples electrical power signal carried on twisted wire pair 130 and provides the decoupled electricity to DC-DC converter 126. Referring now to FIG. 15c, an embodiment similar to FIG. 15b, however, incorporating AC power is shown. AC power supply 1550, which may derive power from subscriber mains power, is coupled to SLIC 134 and a bridge rectifier and reservoir capacitor 1555 to regulate and convert AC power signal to a DC power signal which is then provided to DC-DC converter 126

Figure 16A:
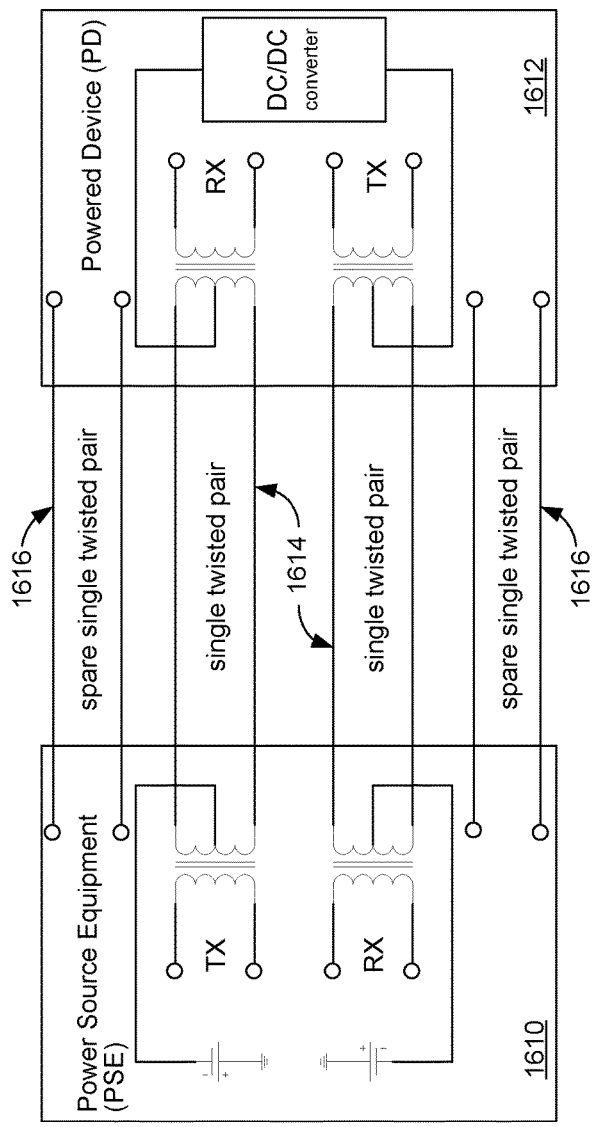
FIG. 16a is an illustration of an exemplary circuit model of an electrical coupling device for combining Ethernet communications and DC electrical power.
Figure 16B:
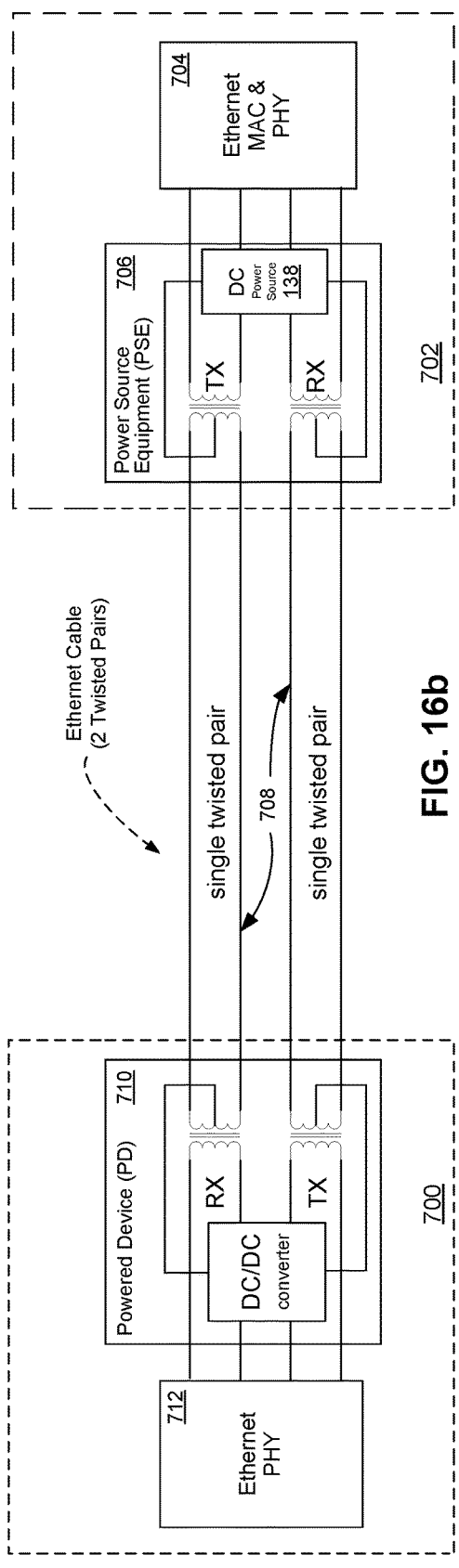

Referring now to FIG. 16a, an exemplary illustration of a circuit model of an electrical coupling device for coupling Ethernet communications and DC electrical power is shown. An Ethernet power source equipment device (PSE) 1610 and an Ethernet powered device (PD) 1612 utilize center-tapped transformers on two pairs of conductors 1614 (e.g., two twisted wire pairs) to evenly transfer electricity from the PSE 1610 to PD 1612. An alternative embodiment may utilize the spare twisted wire pairs 1616 instead of twisted wire pairs 1614. Referring now to FIG. 16b, an exemplary illustration of a circuit model for coupling Ethernet communications and DC electrical power between a subscriber terminal 702 and a network element (e.g., ONU) 700 in view of FIG. 16a and FIG. 7a is shown. Two pairs of conductors 708 are used to support fast Ethernet communications (i.e. 100 Mbit) and electrical power transfer between PSE 706 and PD 710. Alternative embodiments may use four pairs of conductors to support gigabit Ethernet on CAT 5 cable or fast Ethernet over CAT 3 cable. It will be appreciated while embodiments of the invention employing Ethernet have been shown and referenced as using two or four pairs of conductors, as Ethernet is generally understood to be deployed and thus referenced as such to aid in teaching the invention, embodiments of the invention can use variants of Ethernet that use only a single twisted wire pair of conductors (i.e., one, two or four pairs or up to 4 twisted wire pairs can be used). However, xDSL (e.g, VDSL2) and G.hn technologies are preferred in embodiments using single twisted wire pairs given the maturity and robustness of xDSL and G.hn technology over the medium of single twisted wire pairs.

Figure 17A:
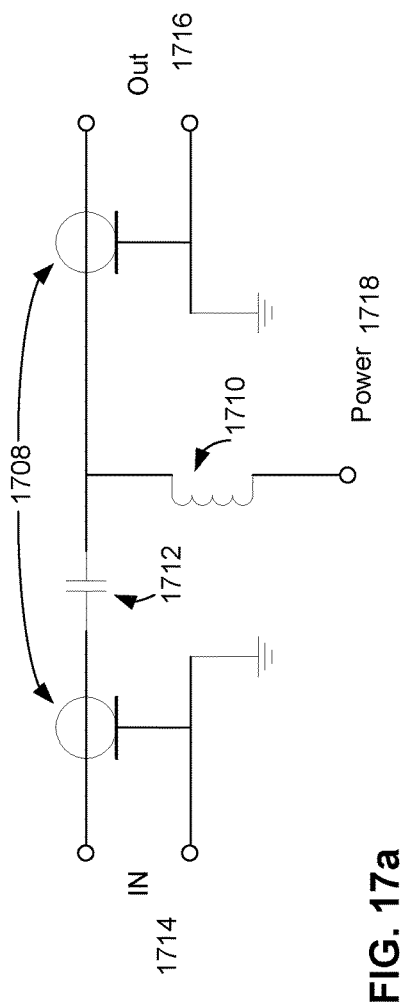
FIG. 17a is an illustration of an exemplary circuit model of an electrical coupling device for combining data communications and DC electrical power.

Referring now to FIG. 17a, an exemplary illustration of a circuit model of an electrical coupling device for coupling data communications and DC electrical power is shown. An alternative method of combing data communications (e.g., DOCSIS, DOCSIS 2.0, DOCSIS 3.0, MoCA, MoCA 2.0 or G.hn modem) and electrical power on the same transmission medium, preferably coaxial cable, utilizes a bias T. A bias T for a coaxial cable 1708 comprises a feed inductor 1710, capable of blocking high frequency signals (e.g., communication signals), and a blocking capacitor 1712, capable of blocking low frequency signals (e.g., DC electrical power, low frequency AC electrical power). Data communications signals are passed through IN 1714 and OUT 1716 ports with only the blocking capacitor in series. The inductor 1710 prevents communications signals from passing through the Power 1718 port and the capacitor 1712 prevents DC power from leaving through the IN 1714 port. The OUT 1716 port comprises both the communication signal from the IN 1714 port and the DC power from the Power 1718 port. Additional circuits or their equivalents may be incorporated to decrease signal losses (e.g., utilizing bias T designs from waveguides or microstrips, additional inductors and capacitors to form resonant frequency circuits, and shunt capacitors) and protect from application of reverse voltage (e.g., an internal blocking diode).

Figure 17B:
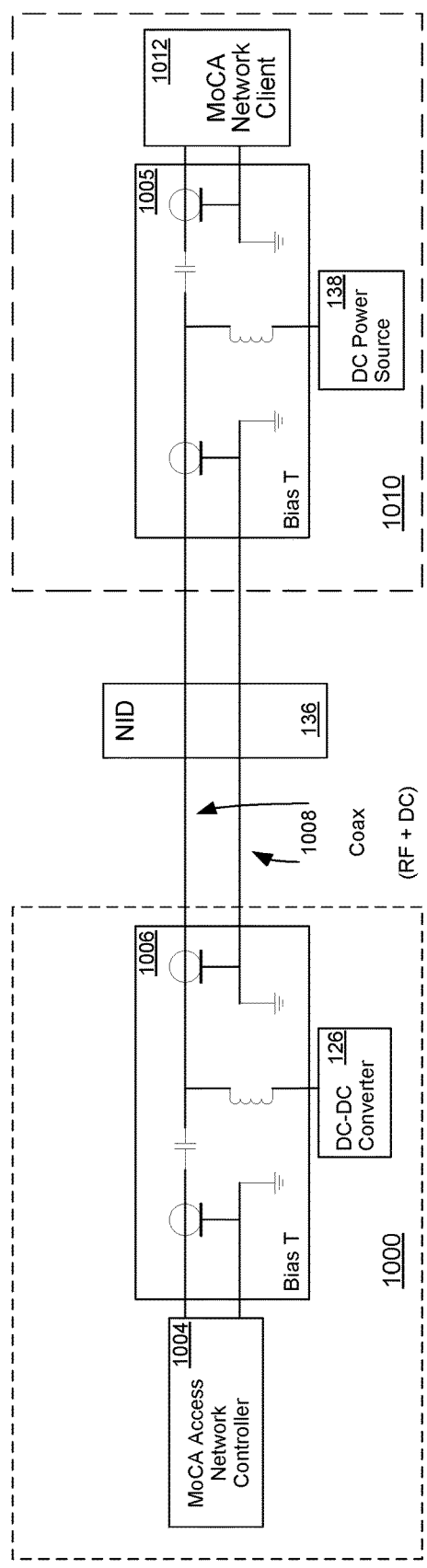
FIG. 17b is an illustration of an exemplary circuit model of an electrical coupling device for combing data communications and DC electrical power in view of FIG. 10.

Referring now to FIG. 17b, an exemplary illustration of a circuit model of an electrical coupling device for coupling data communications and DC electrical power between a subscriber terminal 1010 and a network element (e.g., optical node, ONU) 1000 in view of FIG. 17a and FIG. 10 is shown. A coaxial cable 1008 is used to support data communication and electrical power transfer between bias T 1005 and bias T 1006. Blocking capacitors allow data communications to flow between MoCA client 1012 and MoCA controller 1004 while blocking electrical power. And blocking inductors allow electrical power flow between DC power source 138 and DC-DC converter 126 while blocking data communications. Additional circuitry to translate four-wires onto two-wire transmission lines for full duplex communication is not shown but assumed to be part of the communication devices or modem subsystems (e.g., MoCA client 1012, MoCA controller 1004). It will be appreciated that bias T 1305 of FIG. 13b and FIG. 14b does not comprise a blocking capacitor, such as 1712, to allow DC or AC power to flow onto coaxial cables 1008 and 1308.

As previously mentioned, device detection circuits to determine when a network element is attached or removed from the transmission line may also be included in embodiments of the invention. An exemplary detection circuit and process includes a resistive element or resistive load (e.g. 10-35 kΩ resistor) at the network element placed between powered conductors of the transmission line. In alternative embodiments the resistive load may vary as a function of phase or frequency of a voltage or current. A subscriber terminal senses the resistance between powered conductors through an applied low level current before applying additional voltage and current. Additionally, a network element may vary the resistance seen by the subscriber terminal in a predetermined manner and thereby indicate to the subscriber terminal the power requirements of the network element.

Furthermore, a subscriber terminal may monitor the applied power at predetermined intervals (e.g., 50 ms) for power drops indicating that the network element has been disconnected or a problem with the transmission line. Power drops lasting longer than a second predetermined interval (e.g., 400 ms) will trigger the subscriber terminal to cease applying electrical power to the transmission line(s) until the subscriber terminal senses (e.g., again through a low level current) the predetermined resistive element of the network element once more. In an alternative embodiment wherein there are multiple subscriber terminals sharing the communication transmission line to the network element, after a first subscriber terminal has sensed the network element and provided electrical power to the network element subsequent subscriber terminals that couple to the communication transmission line can sense the presence of electrical power already on the transmission line and not provide additional power. In yet another alternative embodiment, a subscriber terminal can be powered over a shared communication transmission line from another subscriber terminal.

It will be appreciated that embodiments of subscriber terminals or network elements may incorporate a large capacitor or small battery that can power the subscriber terminal or network element to support sending a Dying Gasp message. A Dying Gasp message or signal is sent by the subscriber terminal or network element to the head-end or CO letting the head-end or CO (e.g., an OLT) know that a subscriber terminal (Dying Gasp message relayed by the network element for the subscriber terminal) or network element has lost electrical power and is about to go offline. This saves a service provider time by alerting them to what has caused the connection failure. It will be appreciated that the large capacitor or small battery can be part of the power supply of the subscriber terminal or network element or the capacitors of the power supply (i.e., power supply reserves) can be used to support sending a Dying Gasp message. It will be appreciated that the large capacitor, small battery or power supply reserves in some embodiments can power the subscriber terminal or network element to send the Dying Gasp message for 50 ms or sending the Dying Gasp message multiple times. Additionally, parts or subcomponents of the subscriber terminal or network element can be turned off when sensing power loss and the minimum number of subcomponents and network interfaces to support sending the Dying Gasp message maintained with power from the large capacitor, small battery or power supply reserves. Additionally the Dying Gasp message can be a bit indicator in the overhead section of a message frame used for network communications. Furthermore, the Dying Gasp message or signal can be sent between the subscriber terminal and the network element as well.

It will be appreciated that embodiments of the subscriber terminal or network element can incorporate power status indicators (e.g., LED power status indicators that blink or change color). For example status indicators at the subscriber terminal can indicate whether the subscriber terminal is ready to supply electrical power to the network element or if the subscriber terminal is providing electrical power to network element or if the subscriber terminal has received a Dying Gasp message from the network element. The network element status indicators can indicate whether the network element is receiving electrical power from the subscriber terminal or if the network element is running on battery reserves or if the network element has received a Dying Gasp message from the subscriber terminal (network terminal is running on battery reserves). It will be appreciated there can also be communication status indicators at embodiments of the subscriber terminal or network element to indicate whether or not communication has been established or is taking place (e.g., blinking) between the subscriber terminal and the network element. It will be appreciated that the CO can monitor the power status (e.g., power ready, steady state, on battery reserves) of network elements and subscriber terminals through network administration or management messages or network system alarms.

Referring now to FIG. 18, an exemplary illustration of the frequency spectrum used by various communication protocols is shown. While not complete with all possible communication protocols nor drawn to scale, FIG. 18 serves to illustrate that communication protocols have defined frequency distributions and that the methods of embodiments of the invention for combining an electrical power signal or electricity and electrical data communication signals on the same communication medium as a combined electrical signal are methods that are apathetic and even naïve of the design choice or implementation of the data communication signals used between the network element and the subscriber. Communication devices compatible or compliant with communication protocols such as but not limited to: ADSL ANSI T1.413, ITU-T G.992.1 (G.DMT), ITU-T G.992.2 (G.lite); ADSL2 ITU-T G.992.3/4; ADLS2+ITU-T G.992.5; VDSL ITU-T G.993.1; VDSL2 ITU-T G.993.2; DOCSIS 1.0, ITU-T J.112 (1998); DOCSIS 1.1, ITU-T J.112(2001); DOCSIS 2.0, ITU-T J.122; DOCSIS 3.0, ITU-T J.222, ITU-T J.222.0, ITU-T J.220.1, ITU-T J.222.2, ITU-T J.222.3; HomePNA (HPNA) 2.0, ITU-T G.9951, ITU-T G.9952, ITU-T G.9953; HomePNA (HPNA) 3.0, ITU-T G.9954 (02/05); HomePNA (HPNA) 3.1, ITU-T G.9954 (01/07); HomePlug 1.0, TIA-1113; HomePlug AV, HomePlug AV2, IEEE P1901; Multimedia over Coax Alliance (MoCA) 1.0, MoCA 1.1, MoCA 2.0, www.mocalliance.org; G.hn, ITU-T G.9960, ITU-T G.9961; and G.hnta, ITU-T G.9970 are congruent with methods and embodiments of the invention and these specifications are hereby included by reference.

Preferred embodiments of the invention supply electrical power from the subscriber premise to the network element on the same communication medium on a frequency separate (preferably at a lower frequency) from the frequency of the network communication signals used between the network element and the subscriber premise. For example, using VDSL2 to communicate data between a network element (e.g. ONT/ONU) and a subscriber premise over a twisted wire pair transmission line while remotely powering the network element from the subscriber premise can be accomplished by transmitting DC power (i.e., essentially at zero frequency), AC power at 60 Hz or a DC power signal or AC power signal centered at some frequency other than that used by VDSL2 since VDSL2 occupies frequencies between 25.8 KHz and 30 MHz. In another example, using MoCA to communicate between a network element and a subscriber premise over a coaxial cable while remotely powering the network element can be accomplished by transmitting DC power, AC power at 60 Hz or a DC power signal or AC power signal centered at some frequency other than that used by MoCA since MoCA occupies frequencies between 860 MHz and 1.55 GHz. In yet another example, using ITU-T G.hn to communicate between a network element and a subscriber premise over either a twisted wire pair or coaxial cable transmission line while remotely powering the network element can be accomplished by transmitting a DC power, AC power at 60 Hz or a DC power signal or AC power signal centered at some frequency other than that used by ITU-T G.hn since ITU-T G.hn occupies frequencies between 25.8 KHz and 100 MHz-150 MHz range or bands (depending on speed mode of G.hn network).

Alternatively, while not preferred, embodiments of the invention transmitting power remotely from the subscriber premise to the network element on a frequency occupied, at least in part, by the communication signals used to communicate between the network element and the subscriber premise are envisioned to be possible. The transmitted electrical power would raise the noise power in the communication protocol's frequency spectrum, however as long as the communication signals are transmitted at power levels greater than the raised noise power, communications between the network element and the subscriber premise are still be possible. For example, modern xDSL (e.g., adsl, adsl2, vdsl, vdsl2) modems or G.hn modems measure the noise power spectrum encountered on their transmission lines dynamically or constantly. This information is used to determine the power level of their communication signal transmissions. Therefore, the rise in noise power from remotely transmitting electrical power from the subscriber premise to supply the network element at a frequency that overlaps with the communication frequencies may be compensated by the xDSL modems raising their communication signal transmission levels. However, modems with communication signal power levels beyond conventional signal power levels may be needed. Additionally, the subscriber premise xDSL or G.hn modem should observe the power spectral density or make a spectral density estimation of the twisted wire pair transmission line before any transmission, which can then be used to determine the power levels to supply power and data signals to the network element.

It will be appreciated that while embodiments of the invention have been shown or referenced employing different methods of injecting electrical power to the network element at different locations, any method or combination of injection methods and locations can be employed and injecting electrical power to supply the network element from the subscriber electrical power mains can occur anywhere along the communication transmission line between the subscriber terminal and the network element.

It will be appreciated that embodiments of subscriber terminals and network elements can employ power saving modes and that electrically powering the network element from subscriber mains power over the same medium used for communication as previously described in embodiments of the invention do not prohibit using power saving modes.

It will be appreciated that while progressively powering a network element (e.g., an ONU) has previously been discussed, an embodiment of a network element can employ electrical power load balancing among subscriber terminals that are supplying the network element with electrical power. Additionally, in an alternative embodiment, network administration or management messages can be exchanged between subscriber terminals and network elements wherein subscriber terminals adjust the voltage or current of their electrical power signal supplying the network element responsive to a network message received from the network element or from the CO.

Although the invention has been described in terms of particular implementations or embodiments, one of ordinary skill in the art, in light of this teaching, can generate additional implementations, embodiments and modifications without departing from the spirit of or exceeding the scope of the claimed invention. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Accordingly, it is to be understood that the drawings and descriptions herein are proffered by way of example to facilitate comprehension of the invention and should not be construed to limit the scope thereof.

What is claimed is:

1. A remote power injector disposed for use between a subscriber terminal and an optical network unit (ONU) of a wide area network (WAN), the remote power injector comprising of:
   a first registered jack 11 (RJ-11) WAN socket disposed to couple to a first wire pair coupled to the subscriber terminal for subscriber communications;
   a second RJ-11 WAN socket disposed to couple to a second wire pair coupled to the ONU for ONU communications;
   an electrical port for coupling to AC mains power;
   a DC power source coupled to the electrical port for converting AC power from the AC mains power to one or more DC powers; and
   an electrical coupling device coupled to the first RJ-11 WAN socket and the electrical coupling device coupled to the second RJ-11 WAN socket, wherein the electrical coupling device is disposed to pass subscriber communications received from the first RJ-11 WAN socket to the second RJ-11 WAN socket and wherein the electrical coupling device is disposed to pass ONU communications received from the second RJ-11 WAN socket to the first RJ-11 WAN socket and wherein the electrical coupling device is coupled to the DC power source and the electrical coupling device is disposed to pass one of the one or more DC powers to power the ONU to the second RJ-11 WAN socket.

2. The remote power injector of claim 1, further comprising a second electrical port disposed to couple to a battery and wherein the DC power source is coupled to the second electrical port.

3. The remote power injector of claim 1, wherein the electrical coupling device provides a detection current derived from one of the one or more DC powers through the second RJ-11 WAN socket and responsive to detection of a predetermined load through the second RJ-11 WAN socket the electrical coupling device provides the DC power to power the ONU, wherein the DC power has additional current than the detection current and wherein the predetermined load indicates coupling of the ONU on the second wire pair.

4. The remote power injector of claim 3, wherein the DC power has additional current and voltage than the detection current.

5. The remote power injector of claim 1, wherein the electrical coupling device includes a Power Source Equipment (PSE) device.

6. The remote power injector of claim 1, wherein the electrical coupling device includes a high pass filter coupled to the second RJ-11 WAN socket for passing the ONU communications and wherein the electrical coupling device includes a low pass filter coupled to the second RJ-11 WAN socket for passing the DC power.

7. The remote power injector of claim 1, wherein the electrical coupling device includes a hybrid circuit for coupling four wires onto two wires.

8. The remote power injector of claim 1, wherein the remote power injector sends a Dying Gasp signal through the second RJ-11 WAN socket responsive to loss of AC mains power from the electrical port.

9. The remote power injector of claim 1, wherein the remote power injector sends information about the electrical power through the second RJ-11 WAN socket.

10. A remote power injector disposed for use between a subscriber terminal and an optical network unit (ONU) of a wide area network (WAN), the remote power injector comprising of:
    a first WAN coaxial connector disposed to couple to a first coaxial cable coupled to the subscriber terminal for subscriber communications;
    a second WAN coaxial connector disposed to couple to a second coaxial cable coupled to the ONU for ONU communications;
    an electrical port for coupling to AC mains power;
    a DC power source coupled to the electrical port for converting AC power from the AC mains power to one or more DC powers; and
    an electrical coupling device coupled to the first WAN coaxial connector and the electrical coupling device coupled to the second WAN coaxial connector, wherein the electrical coupling device is disposed to pass the subscriber communications received from the first WAN coaxial connector to the second WAN coaxial connector and wherein the electrical coupling device is disposed to pass the ONU communications received from the second WAN coaxial connector to the first WAN coaxial connector and wherein the electrical coupling device is coupled to the DC power source and the electrical coupling device is disposed to pass one of the one or more DC powers to power the ONU to the second WAN coaxial connector.

11. The remote power injector of claim 10, wherein the first WAN coaxial connector is an F-type connector or an N-type connector and the second WAN coaxial connector is an F-type connector or an N-type connector.

12. The remote power injector of claim 10, further comprising a second electrical port disposed to couple to a battery and wherein the DC power source is coupled to the second electrical port.

13. The remote power injector of claim 10, wherein the electrical coupling device provides a detection current derived from one of the one or more DC powers through the second WAN coaxial connector and responsive to detection of a predetermined load through the second WAN coaxial connector the electrical coupling device provides the DC power to power the ONU, wherein the DC power has additional current than the detection current and wherein the predetermined load indicates coupling of the ONU on the second coaxial cable.

14. The remote power injector of claim 13, wherein the DC power has additional current and voltage than the detection current.

15. The remote power injector of claim 10, wherein the electrical coupling device includes a Power Source Equipment (PSE) device.

16. The remote power injector of claim 10, wherein the electrical coupling device includes a high pass filter coupled to the second WAN coaxial connector for passing the ONU communications and wherein the electrical coupling device includes a low pass filter coupled to the second WAN coaxial connector for passing the DC power.

17. The remote power injector of claim 10, wherein the electrical coupling device includes a bias T device.

18. The remote power injector of claim 10, wherein the remote power injector sends a Dying Gasp signal through the second WAN coaxial connector responsive to loss of AC mains power from the electrical port.

19. The remote power injector of claim 10, wherein the remote power injector sends information about the electrical power through the second WAN coaxial connector.

20. A remote power injector disposed for use between a subscriber terminal and an optical network unit (ONU) of a wide area network (WAN), the remote power injector comprising of:
- a first registered jack 45 (RJ-45) WAN socket disposed to couple to a first Ethernet cable coupled to the subscriber terminal for subscriber Ethernet communications;
- a second RJ-45 WAN socket disposed to couple to a second Ethernet cable coupled to the ONU for ONU Ethernet communications;
- an electrical port for coupling to AC mains power;
- a DC power source coupled to the electrical port for converting AC power from the AC mains power to one or more DC powers; and
- an electrical coupling device coupled to the first RJ-45 WAN socket and the electrical coupling device coupled to the second RJ-45 WAN socket, wherein the electrical coupling device is disposed to pass subscriber Ethernet communications received from the first RJ-45 WAN socket to the second RJ-45 WAN socket and wherein the electrical coupling device is disposed to pass ONU Ethernet communications received from the second RJ-45 WAN socket to the first RJ-45 WAN socket and wherein the electrical coupling device is coupled to the DC power source and the electrical coupling device is disposed to pass one of the one or more DC powers to power the ONU to the second RJ-45 WAN socket.

21. The remote power injector of claim 20, wherein the electrical coupling device provides a detection current derived from one of the one or more DC powers through the second RJ-45 WAN socket and responsive to detection of a predetermined load through the second RJ-45 WAN socket the electrical coupling device provides the DC power to power the ONU, wherein the DC power has additional current than the detection current and wherein the predetermined load indicates coupling of the ONU on the second Ethernet cable.

22. The remote power injector of claim 21, wherein the DC power has additional current and voltage than the detection current.

23. The remote power injector of claim 20, wherein the electrical coupling device includes a Power Source Equipment (PSE) device.

* * * * *